US012580790B2

(12) United States Patent
Goyal et al.

(10) Patent No.: US 12,580,790 B2
(45) Date of Patent: Mar. 17, 2026

(54) CONTROLLER AREA NETWORK EXTRA-LONG (CAN-XL) LOW LATENCY HARDWARE AND SOFTWARE PARTITIONED ARCHITECTURE FOR MESSAGE HANDLER

(71) Applicant: STMicroelectronics International N.V., Geneva (CH)

(72) Inventors: Avneep Kumar Goyal, Greater Noida (IN); Nicolas Guion, Change (FR); Sumit Kumar Singhal, Jaipur (IN); Jagtar Singh, Faridabad (IN); Dhulipalla Phaneendra Kumar, Bangalore (IN)

(73) Assignee: STMICROELECTRONICS INTERNATIONAL N.V., Geneva (CH)

( * ) Notice: Subject to any disclaimer, the term of this patent is extended or adjusted under 35 U.S.C. 154(b) by 99 days.

(21) Appl. No.: 18/155,094

(22) Filed: Jan. 17, 2023

(65) Prior Publication Data
US 2024/0243945 A1 Jul. 18, 2024

(51) Int. Cl.
*H04L 12/40* (2006.01)

(52) U.S. Cl.
CPC .................. *H04L 12/40143* (2013.01); *H04L 2012/40215* (2013.01)

(58) Field of Classification Search
CPC ................................................ H04L 12/40143
See application file for complete search history.

(56) References Cited

U.S. PATENT DOCUMENTS

| | | | | |
|---|---|---|---|---|
| 10,956,356 B1 * | 3/2021 | Kulandaivel | ............. | G06F 1/04 |
| 2006/0037008 A1 * | 2/2006 | Stelzer | .................... | G06F 30/34 |
| | | | | 717/109 |

(Continued)

FOREIGN PATENT DOCUMENTS

| | | |
|---|---|---|
| EP | 3621248 A1 | 3/2020 |
| EP | 4044041 A1 | 8/2022 |

OTHER PUBLICATIONS

Choi, et al, "High-Speed, Low-Latency In-Vehicle Network Based on the Bus Topology for Autonomous Vehicles: Automotive Networking and Applications", *IEEE Vehicular Technology Magazine*, Mar. 2022, (11 pages), doi:10.1109/MVT.2021.3128876.

(Continued)

*Primary Examiner* — Nam T Tran
(74) *Attorney, Agent, or Firm* — Alston & Bird LLP

(57) ABSTRACT

Apparatuses and computer-implemented methods for implementing a message-based protocol interface with a communication bus are provided. An example apparatus for implementing a message-based protocol interface with a communication bus may include message handler core circuitry having a transmit message buffer, wherein the transmit message buffer is configured to store a portion of a transmit message. The apparatus may further include receive handler circuitry configured to store a portion of a received message. The apparatus further includes a message handler processor comprising a processor and an instruction memory including program code, the instruction memory and program code configured to, with the processor, cause the message handler processor to transmit at least the portion of the transmit message from a transmit data memory to the message handler core circuitry and receive the received message from the receive handler circuitry into a receive data memory.

19 Claims, 9 Drawing Sheets

(56) References Cited

U.S. PATENT DOCUMENTS

| | | | |
|---|---|---|---|
| 2006/0134479 A1* | 6/2006 | Hu .................... | H01M 8/04955 |
| | | | 429/429 |
| 2019/0268444 A1* | 8/2019 | Mardmoeller .......... | H04L 12/66 |
| 2022/0150091 A1 | 5/2022 | Mutter et al. | |
| 2022/0318178 A1* | 10/2022 | Elend ................ | H04L 12/40176 |
| 2023/0110907 A1* | 4/2023 | Hoffleit ............ | H04L 12/40006 |
| | | | 710/22 |
| 2024/0217458 A1* | 7/2024 | Kontani .................. | H04L 12/28 |

OTHER PUBLICATIONS

Extended European Search Report for Application No. 24305035.8, dated Jun. 18, 2024, 12 pages.
Bosch, "CAN XL—Next Step in CAN Evolution Background & Target Background", May 26, 2020, XP055740502, Retrieved from the Internet Oct. 15, 2020: https://www.bosch-semiconductors.com/media/ip_modules/pdf_2/can_xl_1/canxl_intro, (13 pages).

* cited by examiner

CONTROLLER AREA NETWORK EXTRA-LONG (CAN-XL) LOW LATENCY HARDWARE AND SOFTWARE PARTITIONED ARCHITECTURE FOR MESSAGE HANDLER

TECHNOLOGICAL FIELD

Embodiments of the present disclosure relate generally to message handlers for a message-based protocol, and more particularly, to a hardware and software partitioned message handler for a Controller Area Network Extra-Long (CAN-XL) message-based protocol interface.

BACKGROUND

Electronic systems containing various electronic components often utilize a communication network, such as a communication bus to internally communicate between components. A communication bus allows the various components to transfer data, alerts, interrupts, and other encoded information between the electronic components. In order to transmit data between components, a message-based protocol may be used. A message-based protocol defines the rules, syntax, semantics, and synchronization to enable two connected devices to communicate meaningful data via message transmissions. One such message-based protocol is the Controller Area Network (CAN) protocol.

The CAN protocol utilizes serial communication to transmit messages (or CAN frames) between connected components. The CAN messages include a start of the message, an arbitration ID, payload or data, error checking, and other information to aid the transmission and receipt of data between components. In general, the CAN protocol enables a robust, high-speed communication network to be established between connected components without excessive wiring. Communication buses utilizing the CAN protocol have become an important part of communication between the internal components of automobiles. However, communication buses utilizing the CAN protocol may be utilized in any number of applications requiring a dependable and fast communication protocol, including cars, medical devices, airplanes, factory systems, trains, navigation systems, and so on.

Controller Area Network Extra-Long (CAN-XL) has been developed based on the CAN protocol to support higher data rates, bigger payload sizes which can be used for tunneling of message frames of other communication protocols, security and virtualization support, better error checking, and other improvements.

Applicant has identified many technical challenges and difficulties associated with implementation of an interface supporting the CAN-XL and other message-based protocols. Through applied effort, ingenuity, and innovation, Applicant has solved problems related to the CAN-XL interface by developing solutions embodied in the present disclosure, which are described in detail below.

BRIEF SUMMARY

Various embodiments are directed to example apparatus, and computer-implemented methods for sending and receiving messages in compliance with a message-based protocol, such as CAN-XL.

In accordance with some embodiments of the present disclosure, an example apparatus for implementing a message-based protocol interface with a communication bus is provided. In some embodiments, the apparatus may comprise message handler core circuitry comprising a transmit message buffer, wherein the transmit message buffer is configured to store at least a portion of a transmit message and receive handler circuitry configured to store at least a portion of a received message. In some embodiments, the apparatus may further comprise a message handler processor comprising a processor and an instruction memory including program code, the instruction memory and program code configured to, with the processor, cause the message handler processor to transmit at least the portion of the transmit message from a transmit data memory to the message handler core circuitry and receive the received message from the receive handler circuitry into a receive data memory.

In some embodiments, the message-based protocol may be a controller area network extra-long (CAN-XL) protocol.

In some embodiments, the apparatus may further support operation in accordance with a Classic CAN protocol and a CAN FD protocol.

In some embodiments, the apparatus may further comprise protocol control circuitry configured to generate an output sequence encoding an outgoing message based at least in part on the transmit message and in accordance with the message-based protocol, and receive an input sequence encoding the received message in accordance with the message-based protocol.

In some embodiments, the transmit message buffer may be configured to store at least a portion of a plurality of transmit messages, and a selected transmit message may be selected from the plurality of transmit messages based on the portions of the plurality of transmit messages in the transmit message buffer.

In some embodiments, the message handler core circuitry may further comprises a priority decoder, wherein the priority decoder may be configured to select the selected transmit message based at least in part on a transmit message priority indicated in the portion of the transmit message stored in the transmit message buffer.

In some embodiments, the message handler core circuitry may further comprise a transmit FIFO, wherein at least a second portion of the selected transmit message is transmitted by the message handler processor to the transmit FIFO.

In some embodiments, the transmit message may be selected from the transmit data memory based on a transmit message priority and a portion of the transmit message may be transmitted to the transmit message buffer, wherein, in an instance in which the transmit message is selected by the message handler core circuitry to be transmitted, a second portion of the transmit message is transmitted to the transmit payload circuitry.

In some embodiments, a payload size of the transmit message may be bigger than a maximum capacity of the transmit FIFO, wherein the transmit message may be transmitted to the transmit FIFO in portions according to a paging scheme.

In some embodiments, in an instance in which the priority decoder determines a high priority message stored in the transmit message buffer has a higher transmit message priority than the transmit message priority of the selected transmit message, the portion of the selected transmit message stored in the transmit FIFO may be replaced with a portion of the high priority message.

In some embodiments, the apparatus may further comprise a buffer status generator wherein the buffer status generator may be configured to generate a buffer status code indicating a status of the transmit message buffer.

In some embodiments, the message handler processor may update the transmit FIFO based on the buffer status code after updating a software-programmable message buffer request bit.

In some embodiments, the transmit message buffer may be configured to store the portion of two transmit messages, and the transmit FIFO may be configured to store the second portion of one selected transmit message.

In some embodiments, the transmit data memory may be configured to store a plurality of transmit messages.

In some embodiments, the receive data memory may be configured to store a plurality of received messages.

An example computer-implemented method for transmitting messages on a communication bus in compliance with a message-based protocol is also provided. In some embodiments, the computer-implemented method may comprise receiving, at a message handler processor, a plurality of transmit messages comprising at least a transmit message priority and a payload, wherein the message handler processor comprises a processor and an instruction memory including program code. The method may further comprise storing the plurality of transmit messages in a transmit data memory, selecting, based on the transmit message priority, a transmit message from the plurality of transmit messages, transmitting a portion of the transmit message to message handler core circuitry comprising at least a transmit message buffer and a transmit FIFO, receiving, from the message handler core circuitry, notification of a selected transmit message, and transmitting a second portion of the transmit message, comprising at least the payload, to the message handler core circuitry to be transmitted on the communication bus.

In some embodiments, the message-based protocol may be a controller area network extra-long (CAN-XL) protocol.

In some embodiments, the message handler processor may comprise a combination of software and hardware components and the message handler core circuitry may comprise hardware components.

In some embodiments, the computer-implemented method may further comprise receiving, from the message handler core circuitry a received message, and storing the received message in a receive data memory.

Another example apparatus implementing a message-based protocol interface with a communication bus is provided. In some embodiments, the apparatus may comprise message handler core circuitry comprising a transmit message buffer, wherein the transmit message buffer is configured to store a first portion of a selected transmit message. The example apparatus may further comprise a transmit FIFO, wherein the transmit FIFO may be configured to store a second portion of a selected transmit message. The example apparatus may further comprise receive handler circuitry configured to store at least a portion of a received message received from the communication bus, wherein the first portion of the selected transmit message and the second portion of the selected transmit message are transmitted on the communication bus. The example apparatus may further comprise a message handler processor comprising a processor and an instruction memory including program code, the instruction memory and program code configured to, with the processor, cause the message handler processor to store in a transmit data memory a plurality of transmit messages comprising at least the selected transmit message; transmit the first portion of the selected transmit message to the transmit message buffer; transmit the second portion of the selected transmit message to the transmit FIFO; and receive the received message from the receive handler circuitry into a receive data memory.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
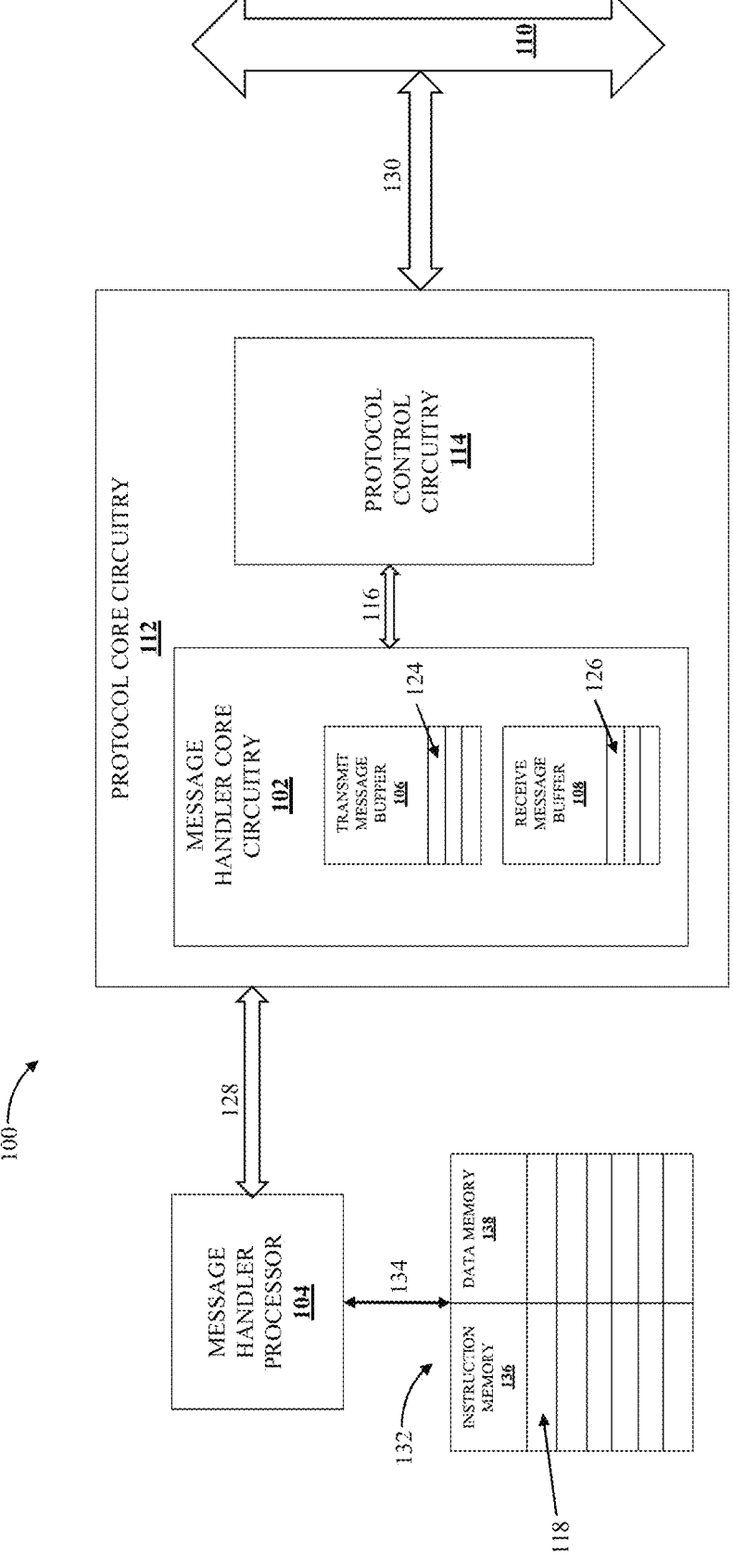
FIG. 1 depicts a block diagram of an example message-based protocol interface utilizing software and hardware partitioning in accordance with an example embodiment of the present disclosure.

Example embodiments will be described in detail hereinafter with reference to the accompanying drawings, in which some, but not all embodiments of the inventions of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Various example embodiments address technical problems associated with implementing a message-based protocol (e.g., CAN-XL) message handler on an electronic device. As understood by those of skill in the field to which the present disclosure pertains, there are numerous example scenarios in which a user may desire to utilize a robust, secure, and safe message-based protocol supporting high data rates and large payload sizes, such as CAN-XL.

For example, modern automobiles include numerous sensors and microcontrollers related to the operation of the vehicle. These sensors may monitor the automotive power train operation, report on state related to the body of the automobile, monitor measurable information related to the chassis, support driver assistance features, and many other similar purposes. Sensors and microcontrollers such as those described may need to communicate with one another, and with a central processor during operation. A message-based protocol may be used to facilitate communication among the various sensors, monitors, and processors. Utilizing a message-based protocol may enable a network of devices to reliably and quickly communicate while reducing the amount of wiring in the network. In addition, a message-based protocol may support prioritization of messages, such that higher priority messages are transmitted first while lower priority messages may be delayed or overridden. The CAN protocol (Classic CAN) and the CAN flexible data-rate (CAN FD) are both examples of message-based protocols designed to meet such requirements. One property of the CAN protocol enabling the prioritization of messages is carrier sense multiple access-collision resolution (CSMA-CR). CSMA-CR is achieved using wire ANDing on differential communication bus of CAN nodes network. For more information on collision resolution refer CAN Stds. viz. "CiA® 610-1 CAN-XL specifications and test plans Part 1: Data link layer and physical signaling" and "ISO® 11898-1:2015 CAN data link layer and physical signaling".

"CiA® 610-1 CAN-XL specifications and test plans Part 1: Data link layer and physical signaling" defines an enhanced version of CAN protocol called CAN-XL. CAN-XL supports multiple new features such as higher payload data rates, increased payload size up to 2048 bytes, multiple cyclical redundancy checks (CRCs) for improved error checking and to support the increased payload size, virtualization and security bit in the message frame itself, etc. In addition, the increased payload data size can support tunnelling of message frames of other communication protocols over CAN-XL link layer, for example it can support message frames complying with Ethernet protocol. CAN-XL protocol has been developed to support a max payload data rate of 10 megabits per second although not limited to 10 megabits per second. Payload data rate can be further increased to 20 megabits per second or further. CAN-XL protocol supports a max payload size of 2048 bytes, while the previous version of CAN protocol, CAN-FD, is supporting a max payload size of only 64 bytes. In addition, the CAN-XL protocol supports two sets of cyclic redundancy check (CRC) polynomials, while the previous CAN protocol architectures are supporting one.

In some examples, the sending and receiving of messages for a message-based protocol is accomplished primarily in hardware. Hardware refers to physical components of a computing device, such as logic gates, transistors, registers, and flip-flops. Hardware may additionally include look-up tables and memory. Hardware may be designed and implemented at the register-transfer level of abstraction, utilizing, for example a hardware description language. Hardware may additionally be implemented as a field-programmable gate array (FPGA), application-specific integrated circuit (ASIC), or integrated circuit (IC). On the other hand, software is a set of instructions that may be stored in memory and executed by a processor. Software may be developed using a computer language and compiler. Thus, examples that implement a message-based protocol primarily in hardware are often difficult and time consuming to modify and update.

In addition, examples that implement a message handler for a message-based protocol primarily in hardware may occupy a large physical area and be expensive to manufacture. For example, CAN-XL supports a max payload size of 2048 bytes. To meet the required data rate, a message handler may be configured to store an average of 32 transmit messages. Thus, 64 kilobytes of space must be required to buffer messages awaiting transmission. Further, multiple instances of a CAN-XL message handler may be present on a single electronic device, further increasing the required space. In addition, similar space may be necessary for the receipt of messages. Support of acceptance filtering in hardware needs more buffering space to store the acceptable IDs. Hardware based message handler should store ID values which are written by the application software as part of initial configuration. These ID values are compared with the received ID value to decide upon the acceptance or rejection of receiving of current CAN message. Designing a message-handler primarily in hardware and providing enough space to buffer the transmit and receive messages and acceptance IDs may lead to an electronic device that is too big and too expensive for the intended purposes.

On the other hand, examples that implement a message handler for a message-based protocol primarily in software may not transmit and receive data at a speed sufficient to comply with the required data rate of the message-based protocol. In some examples, a message handler for a message-based protocol may utilize random-access memory (RAM) or read-only memory (ROM) accessible to a processor on the electronic device for storing and queuing transmit and receive messages. In general, access to the memory device by the processor is considerably slower than buffering and queueing data in memory accessible by hardware. As such, examples that implement a message handler for a message-based protocol primarily in software may be unable to transmit and receive messages at sufficient speeds. The inability to meet timing requirements of the protocol may lead to overwritten, dropped, and/or corrupt messages.

The various example embodiments described herein utilize various techniques to implement a hardware and software partitioned architecture for a message handler of a message-based protocol, such that the message handler can meet timing requirements of the message-based protocol without a significant increase in the cost or size of the electronic device. For example, in some embodiments, a software-implemented message handler processor manages a transmit data memory and a receive data memory; queuing a plurality of transmit messages to be transmitted on the communication bus in compliance with the message-based protocol, and buffering a plurality of received messages received from the communication bus. In some embodiments, the software-implemented message handler processor may transmit a portion of one or more transmit messages contained in the transmit data memory to an available transmit message buffer of a plurality of transmit message buffers contained on hardware-implemented message handler core circuitry. The portion of the one or more transmit messages may be selected by the message handler to be written to the transmit message buffer based on the priority of the message.

The hardware-implemented message handler core circuitry may utilize priority decoder circuitry to select a message from the plurality of transmit message buffers to transmit, once again based on the priority of the messages contained in the transmit message buffer. In some embodiments, once selected, the rest of the selected message, including the payload, may be transmitted to a transmit FIFO in preparation for transmission to the protocol control circuitry and eventual transmission across the communication bus. Utilizing a hardware transmit FIFO to store the transmit message before transmission onto the communication bus allows the message handler to meet timing requirements of the message-based protocol without further expanding the memory within the message handler core circuitry.

In some embodiments, storage buffers in the hardware of the message handler are arranged in such a way which store only a small set of words of different CAN messages. There may be more than one such message buffer to store different CAN messages. These small set of words, stored in message buffers, contain CAN message header information which comprises message ID, as well as other information like payload size and a few words of payload data. Message ID of CAN messages stored in message buffers are used in priority decoding to decide the highest priority CAN message available in CAN message buffers. In a hardware-software portioned architecture and design of message handler, it is possible that some CAN messages are either accessed or updated at the same time. For example, an access may be made by the transmit logic of the message handler, while the software portion of message handler is simultaneously attempting to update the CAN message in the message handler with a higher priority CAN message which should be transmitted first. This condition may create a race condition between the transmit logic and software portion of message handler. To handle this condition the message buffers are associated with a unique Buffer-Status-Code for each message buffer. These Buffer-Status-Codes are set according to the active state of message buffer and allow software to check the status of the target message buffer before and after initiating the update request of the targeted message buffer.

In other embodiments, to store the payload data of the selected higher priority message a single memory may be used in the hardware message handler. A first-in, first-out (FIFO) based update mechanism may be selected for this memory. Each FIFO may be updated using programmable page-size segments. A programmable page-size mechanism allows a message-based protocol interface to tune the FIFO update process according to access latency of the final system. Having this approach, the FIFO memory space is efficiently utilized with the tuned access delay with respect to the service latency of next transmit data interrupt.

As a result of the herein described example embodiments and in some examples, the message handler for a message-based protocol is architected and designed to meet or exceed target payload data rates of the CAN-XL protocol without a substantial increase in size or cost of the implementing device.

Referring now to FIG. 1, an example message-based protocol interface 100 is provided. As depicted in FIG. 1, the example message-based protocol interface 100 includes protocol core circuitry 112 comprising the message handler core circuitry 102 and protocol control circuitry 114. The protocol control circuitry 114 and the message handler core circuitry 102 are electrically connected via a protocol control interface 116. In addition, the example protocol core circuitry 112 is further electrically connected to a message handler processor 104 through a hardware-software interface 128. As further depicted in FIG. 1, the message handler processor 104 is electrically and communicatively connected to a memory block 132 comprising at least instruction memory 136, and data memory 138 via a memory interface 134. Further, the protocol core circuitry 112 is electrically and communicatively connected to a communication bus 110 via a communication bus interface 130.

As depicted in FIG. 1, the example message-based protocol interface 100 comprises protocol core circuitry 112. The example protocol core circuitry 112 may be any hardware component or plurality of hardware components configured to receive and transmit messages in accordance with a message-based protocol, such as CAN-XL. The protocol core circuitry 112 may comprise physical components such as logic gates, transistors, registers, look-up tables, flip-flops, and/or similar hardware components. The protocol core circuitry 112 may be designed and implemented at the register-transfer level of abstraction by modeling the flow of digital signals between hardware registers and logic gates. In some embodiments, the protocol core circuitry 112 may be implemented as a field-programmable gate array (FPGA), application-specific integrated circuit (ASIC), or integrated circuit (IC). Changes to the operation of the protocol core circuitry 112 may require a rebuild of hardware components and/or a reflash of implemented circuitry. As depicted in FIG. 1, the example protocol core circuitry 112 includes protocol control circuitry 114 and the message handler core circuitry 102.

As further depicted in FIG. 1, the example protocol core circuitry 112 of the example message-based protocol interface 100 includes message handler core circuitry 102. Message handler core circuitry 102 may be any hardware component or plurality of hardware components configured to receive at least a portion of a transmit message and transmit the transmit message, including the received portion to a communication bus interface 130 for transmission on a communication bus 110. The message handler core circuitry 102 may comprise physical components such as logic gates, transistors, registers, look-up tables, flip-flops, and/or similar hardware components. The message handler core circuitry 102 may be designed and implemented at the register-transfer level of abstraction by modeling the flow of digital signals between hardware registers and logic gates. In some embodiments, the message handler core circuitry 102 may be implemented as a field-programmable gate array (FPGA), application-specific integrated circuit (ASIC), or integrated circuit (IC). In general, the message handler core circuitry 102 may be characterized by high-speed operation. However, components of the message-based protocol interface 100 may be expensive to design and implement, may require significant area, and may be difficult and time-consuming to update and change. Further details of the message handler core circuitry 102 are provided in FIG. 3.

As further depicted in FIG. 1, the example message handler core circuitry 102 includes a transmit message buffer 106. A transmit message buffer 106 may be any memory cell or block of memory cells directly accessible by the message handler core circuitry 102. For example, in some embodiments, the transmit message buffer 106 may comprise one or more memory cells forming registers, flip-flops, look-up tables, and other similar memory devices. The transmit message buffer 106 may be configured to hold at least a transmit message portion 124 of a message scheduled for transmission on the communication bus 110. For example, in some embodiments, each transmit message buffer 106 of a plurality of transmit message buffers 106 may be configured to store 4 words (or 8 bytes/64 bits) of a transmit message. In such an embodiment, the transmit message buffers 106 may provide a staging area in which the message scheduled for transmission may be identified before the message is transmitted to the communication bus 110 via the communication bus interface 130.

As described herein, in some embodiments, the transmit message buffer 106 may include a transmit message portion 124. The transmit message portion 124 may be any portion of a transmit message to be transmitted on the communication bus 110 through the communication bus interface 130. In some embodiments, the transmit message portion 124 may include metadata and/or other header information related to the transmit message. The transmit message portion 124, for example, may include an identifier of the associated transmit message, or a transmit message priority of the associated transmit message. In some embodiments, the message handler core circuitry 102 may determine the order the transmit messages are sent based on the transmit message portion 124 and/or associated transmit message priority contained in a plurality of transmit message buffers 106.

Figure 3:
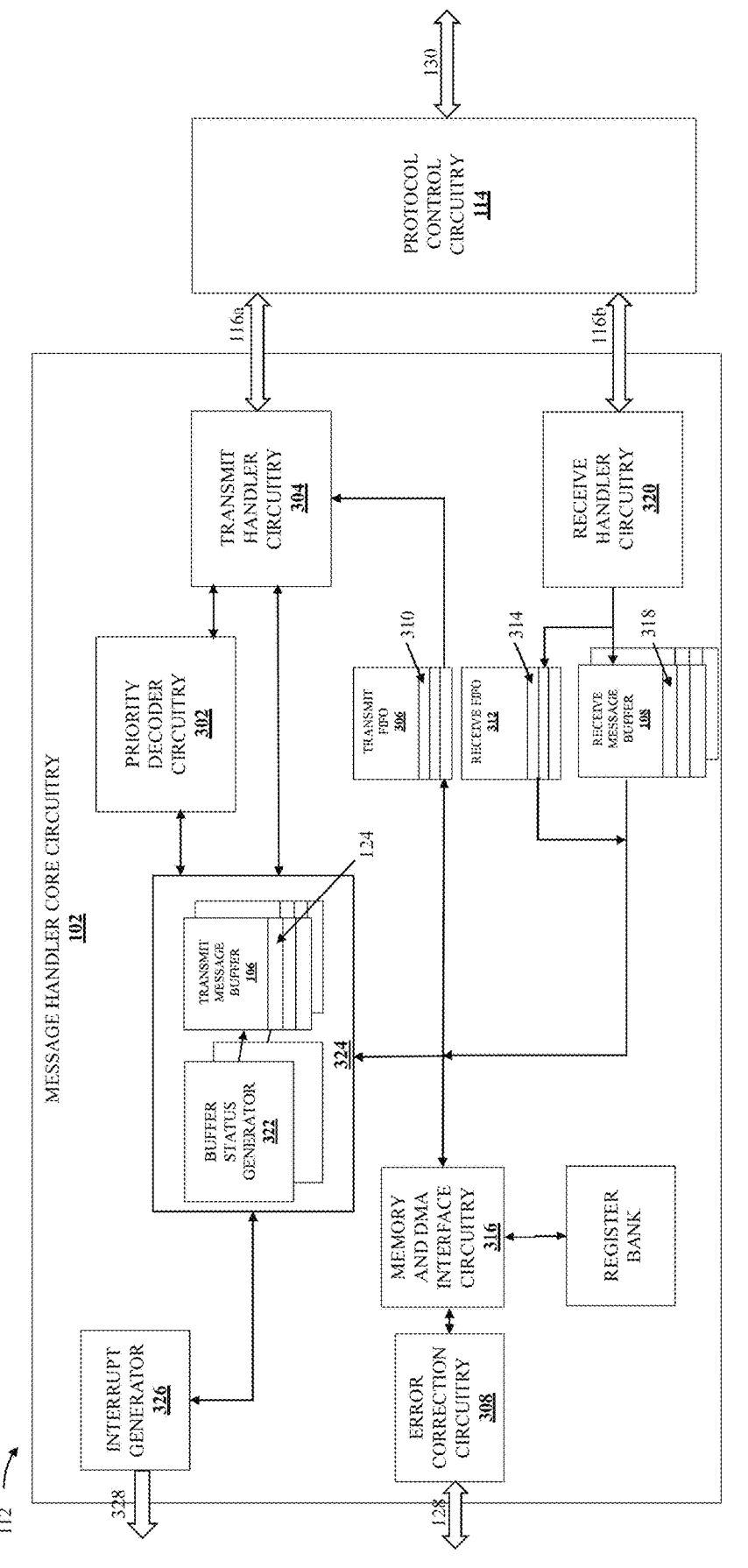
FIG. 3 depicts a detailed view of protocol core circuitry in accordance with an example embodiment of the present disclosure.

As further depicted in FIG. 1, the example message handler core circuitry 102 includes a receive message buffer 108. The receive message buffer 108 may be any memory, logic, and/or other circuitry configured to buffer one or more received messages 126 received from the communication bus 110 via the communication bus interface 130. In some embodiments, the receive message buffer 108 may be configured to receive a portion of the received message 126. In such an embodiment, the remaining portion of the received message 126 may be stored in a temporary memory storage, such as receive FIFO 312 as depicted in FIG. 3. In some embodiments, the message handler core circuitry 102 may include a plurality of receive message buffers 108, such that messages may be buffered and transmitted to the connected message handler processor 104 according to priority. In some embodiments, the received message 126 may be transmitted from the receive message buffer 108 to a system memory, such as received data memory 510 as described in relation to FIG. 5.

As further depicted in FIG. 1, the example message-based protocol interface 100 includes a message handler processor 104. A message handler processor 104 may be any controller, microcontroller, system-on-chip (SoC), central-processing unit (CPU), or other similar processor configured to execute instructions stored in an instruction memory 136. The message handler processor 104 may be electrically and communicatively connected to the message handler core circuitry via the hardware-software interface 128. The hardware-software interface 128 may comprise physical wiring, pins, conductive channels, or any other connection capable of supporting communication between the message handler core circuitry 102 and the message handler processor 104. The message handler processor 104 may be electrically and communicatively connected to the memory block 132 through the memory interface 134. The memory interface 134 may comprise physical wiring, pins, conductive channels, or any other connection capable of supporting communication between the message handler core circuitry 102 and the memory block 132. The message handler processor 104 may serve as the primary interface between the application layer and the protocol core circuitry 112 as described in relation to FIG. 5-FIG. 8.

The message handler processor 104 may be configured to execute functionality based at least in part on program code 118 stored in the instruction memory 136. The functionality of the message handler processor 104 may be a software implementation. In some embodiments, the functionality of the message handler processor 104 may be updated by storing, overwriting, and/or updating the program code 118 contained in the instruction memory 136. The program code 118 contained in the instruction memory 136 may be updated before start-up and/or after shut-down of the message-based protocol interface 100. The physical components (e.g., circuitry, logic gates, transistor devices) of the message handler processor 104 may remain unchanged even after an update in the functionality of the message handler processor 104. Such flexibility in updating and changing the functionality of the message handler processor 104 may enable changes to the functionality of the message-based protocol interface 100 to be made faster and cheaper than when updates or changes are made to the message handler core circuitry 102. The message handler processor 104 is further described in relation to FIG. 2

As further depicted in FIG. 1, the example message-based protocol interface 100 includes a memory block 132 electrically and/or communicatively connected to the message handler processor 104 through the memory interface 134. The memory block 132 may comprise any volatile or non-volatile computer-readable storage media of any type, such as solid-state storage, and/or the like. The memory block 132 may comprise read-only memory (ROM) and/or random-access memory (RAM). In some embodiments, the memory block 132 may comprise flash memory (e.g., Serial, NOR, and/or the like).

As further depicted in FIG. 1, the example memory block 132 includes an instruction memory 136 comprising program code 118 and data memory 138 comprising data related to the priority ID in the queue of transmit and receive messages along with other information, as well as software code to support acceptance filtering of received messages. In some embodiments, the memory block 132 may be a single contiguous memory. In some embodiments, the memory block 132 may comprise a plurality of memories, each accessible by the message handler processor 104.

The instruction memory 136 may include program code 118 which may be fetched, decoded, and executed by the message handler processor 104 to cause the message handler processor 104 to perform various functions. The program code 118 may comprise any form of machine readable code, including but not limited to binary code, assembly code, and/or high-level computer programming language code.

The data memory 138 may include various data related to the filtering and queueing of transmit and receive messages. For example, in some embodiments, the data memory 138 may include at least a portion of the transmit messages awaiting transmission in the shared application memory 502 as described in relation to FIG. 5. The portion of the transmit message may enable the message handler processor 104 to determine the priority of the transmit messages in the queue, thus enabling the message handler processor 104 to manage the flow of transmit messages into the protocol core circuitry 112 without storing the full transmit message in the data memory 138. Such a scheme directly copying the message from the shared application memory 502 to the protocol core circuitry 112 enables the message-based protocol interface to meet and/or exceed latency requirements without a considerable increase in the required memory.

The data memory 138 may further include data associated with allowed message IDs. In some embodiments, the message-based protocol interface 100 may implement an acceptance filtering scheme. Such a scheme will reject received messages not intended for this protocol node. Depending on the complexity of the system and number of connected devices issuing messages on the communication bus 110, the message-based protocol interface 100 may utilize space within the memory block 132 to store accepted message IDs. Accepted message IDs identify the messages intended to be received by the protocol node which is implementing acceptance filtering, for example protocol core circuitry 112. Clients connected to the particular message-based protocol interface 100 can send messages of any ID as per their programing in the transmit message buffer 106. A received message is stored into received message buffer 108. The message handler processor 104 reads received messages from the received message buffer 108 and applies acceptance filtering based on handler written in its software which is stored into the instruction memory 136. Not all the received messages are further processed by the software of the message handler processor 104. Based on the result of acceptance filtering some messages can be dropped after reading some initial words from received message buffer 108. This decision is made based on message ID based acceptance filtering. The message-based protocol interface 100 may check received messages 126 against acceptance IDs stored in the memory block 132. If the message ID matches an accepted message ID, the received message 126 may be written to the received data memory 510.

As further depicted in FIG. 1, the protocol core circuitry 112 may include protocol control circuitry 114. The protocol control circuitry 114 may be any hardware components and/or plurality of hardware components configured to generate an output sequence and receive input sequences on the communication bus 110 through the communication bus interface 130. The protocol control circuitry 114 may generate an output sequence encoded based on one or more transmit messages in accordance with a message-based protocol. In addition, the protocol control circuitry 114 may transmit a modulated signal to communicate the transmit message in accordance with the message-based protocol. In some embodiments, the protocol control circuitry 114 may transmit serially encoded messages on the communication bus 110.

In addition to transmitting transmit messages encoded in accordance with the message-based protocol, the protocol control circuitry 114 may receive input sequences encoded in accordance with the message-based protocol. The protocol control circuitry 114 may identify and decode input sequences from signals transmitted on the communication bus 110 in accordance with the message-based protocol. Messages received by the protocol control circuitry 114 at the communication bus interface 130 may be converted into digital data and stored in the receive message buffer 108 of the message handler core circuitry 102.

As further depicted in FIG. 1, communication between the message handler core circuitry 102 and the protocol control circuitry 114 may be accomplished utilizing the protocol control interface 116. The protocol control interface 116 may be any wire/conductive channel or set of wires/conductive channels configured to carry digital encoded signals between the protocol control circuitry 114 and the message handler core circuitry 102. In some embodiments, the protocol control interface 116 may comprise a wire/conductive channel, or set of wires/conductive channels for communication related to the transmission of transmit messages (e.g., protocol control transmit interface 116*a* as depicted in FIG. 3), and a separate a wire/conductive channel or set of wires/conductive channels for communication related to the receipt of received messages 126 (e.g., protocol control receive interface 116*b* as depicted in FIG. 3).

Figure 2:
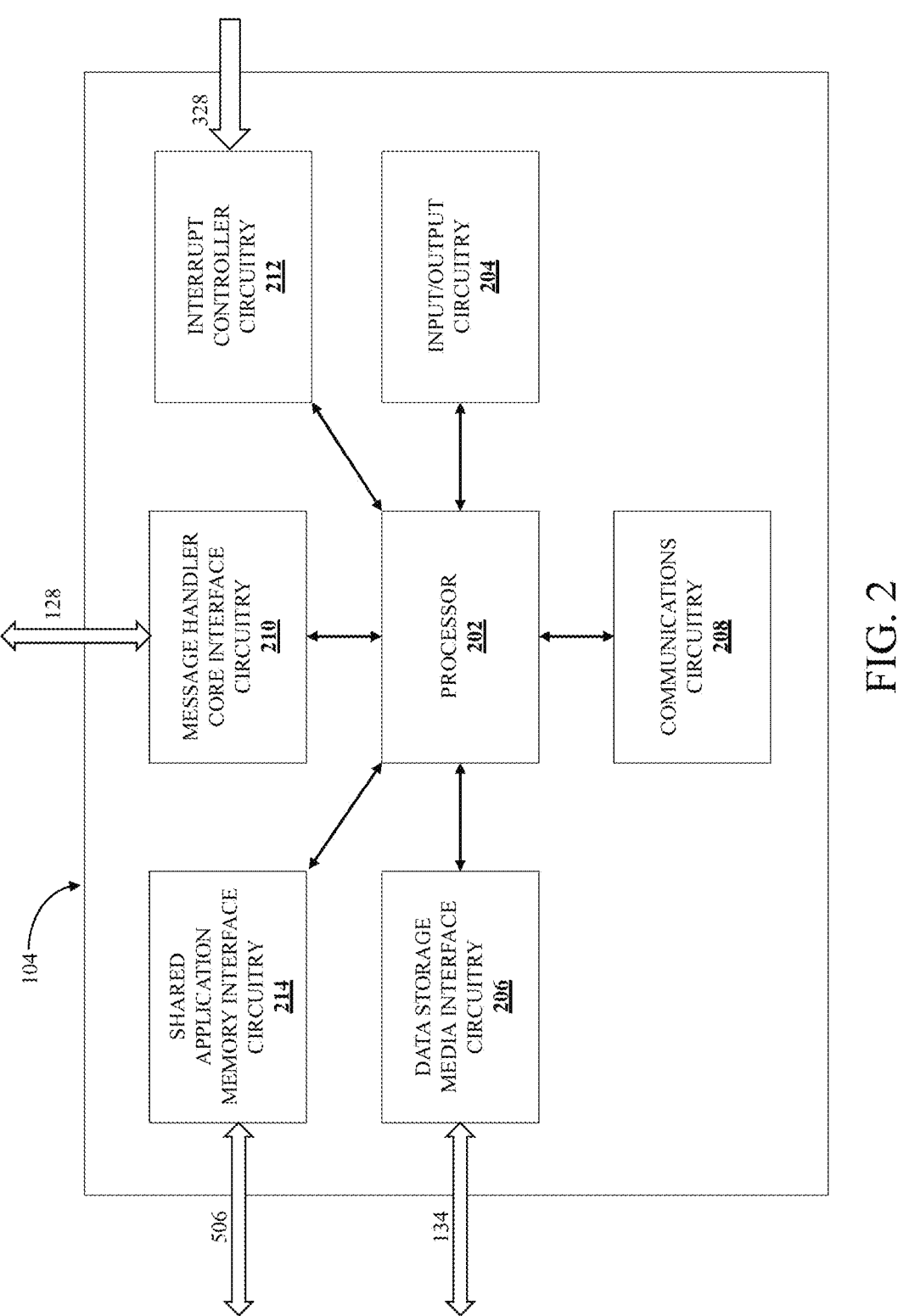
FIG. 2 depicts an example block diagram showing example components of a message handler processor in accordance with an example embodiment of the present disclosure.

Referring now to FIG. 2, FIG. 2 illustrates an example message handler processor 104 in accordance with at least some example embodiments of the present disclosure. The example message handler processor 104 includes processor 202, input/output circuitry 204, data storage media interface circuitry 206, communications circuitry 208, message handler core interface circuitry 210, interrupt controller circuitry 212, and shared application memory interface circuitry 214. In some embodiments, the message handler processor 104 is configured, using one or more of the sets of circuitry 202, 204, 206, 208, 210, 212, and/or 214, to execute and perform the operations described herein.

Although components are described with respect to functional limitations, it should be understood that the particular implementations necessarily include the use of particular computing hardware. It should also be understood that in some embodiments certain of the components described herein include similar or common hardware. For example, two sets of circuitry may both leverage use of the same processor(s), network interface(s), storage medium(s), and/or the like, to perform their associated functions, such that duplicate hardware is not required for each set of circuitry. The user of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the message handler processor 104 provide or supplement the functionality of other particular sets of circuitry. For example, the processor 202 in some embodiments provides processing functionality to any of the sets of circuitry, the data storage media interface circuitry 206 provides storage functionality to any of the sets of circuitry, the communications circuitry 208 provides network interface functionality to any of the sets of circuitry, and/or the like.

In some embodiments, the data storage media interface circuitry 206 is in communication with the memory block 132 via the memory interface 134 and/or the shared application memory 502 via the application memory interface 506. In some embodiments, separate data storage media interface circuitry 206 and/or separate connecting components may be utilized to interface the message handler processor 104 with the various memories, included but not limited to the instruction memory 136, the data memory 138, the transmit data memory 508, and the received data memory 510. The data storage media interface circuitry 206 may provide hardware and functionality to read and write data values to and from the memory block 132.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the message handler processor 104, and/or one or more remote or "cloud" processor(s) external to the message handler processor 104.

In an example embodiment, the processor 202 is configured to execute instructions stored in the instruction memory 136 accessible via the data storage media interface circuitry 206 or otherwise accessible to the processor. In some example embodiments, the processor 202 is embodied as an executor of software instructions, such that the instructions (e.g., program code 118) specifically configure the processor 202 to perform the algorithms embodied in the specific operations described herein when such instructions are executed.

As one particular example embodiment, the processor 202 of the message handler processor 104 is configured to perform various operations associated with receiving a plurality of transmit messages comprising at least a transmit message priority and a payload. Additionally or alternatively, in some embodiments, the message handler processor 104 includes hardware, software, firmware, and/or a combination thereof, that stores the plurality of transmit messages in a transmit data memory. Additionally or alternatively, in some embodiments, the message handler processor 104 includes hardware, software, firmware, and/or a combination thereof, that selects, based on the transmit message priority, a buffered message from the plurality of transmit messages. Additionally or alternatively, in some embodiments, the message handler processor 104 includes hardware, software, firmware, and/or a combination thereof, that transmits a portion of the buffered message to message handler core circuitry (e.g., message handler core circuitry 102) comprising at least a transmit message buffer (e.g., transmit message buffer 106) and a transmit FIFO (e.g., transmit FIFO 306 as described in relation to FIG. 3). Additionally or alternatively, in some embodiments, the message handler processor 104 includes hardware, software, firmware, and/or a combination thereof, that receives, from the message handler core circuitry, notification of a selected transmit message. Additionally or alternatively, in some embodiments, the message handler processor 104 includes hardware, software, firmware, and/or a combination thereof, that transmits a second portion of the buffered message, comprising at least the payload, to the message handler core circuitry to be transmitted on the communication bus (e.g., communication bus 110).

In some embodiments, the message handler processor 104 includes input/output circuitry 204 that provides output to the user and, in some embodiments, to receive an indication of a user input. In some embodiments, the input/output circuitry 204 is in communication with the processor 202 to provide such functionality. The input/output circuitry 204 may comprise one or more user interface(s) (e.g., user interface) and in some embodiments includes a display that comprises the interface(s) rendered as a web user interface, an application user interface, a user device, a backend system, or the like. The processor 202 and/or input/output circuitry 204 comprising the processor may be configured to control one or more functions of one or more user interface elements through computer program instructions (e.g., software and/or firmware) stored on a memory accessible to the processor (e.g., data storage media interface circuitry 206, and/or the like). In some embodiments, the input/output circuitry 204 includes or utilizes a user-facing application to provide input/output functionality to a client device and/or other display associated with a user.

In some embodiments, the message handler processor 104 includes communications circuitry 208. The communications circuitry 208 includes any means such as a device or circuitry embodied in either hardware or a combination of hardware and software that is configured to receive and/or transmit data from/to a network and/or any other device, circuitry, or module in communication with the message handler processor 104. In this regard, the communications circuitry 208 includes, for example in some embodiments, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from a client device in communication with the message handler processor 104.

The message handler core interface circuitry 210 includes hardware, software, firmware, and/or a combination thereof, that supports various functionality associated with transmitting and receiving data to/from the message handler core circuitry 102 on the hardware-software interface 128. For example, the message handler core interface circuitry 210 may enable a message handler processor 104 to transmit signals and data to the message handler core circuitry 102 and receive data, feedback, and or acknowledgement signals from the message handler core circuitry 102. In some embodiments, the message handler core interface circuitry 210 may indicate the presence of a transmit message. In some embodiments, the message handler core interface circuitry 210 may receive an indication to transmit a buffered message contained in the transmit message buffer 106, and may further transmit the payload of the selected transmit message 512. Additionally, the message handler core interface circuitry 210 may perform any other signaling or transmissions required to facilitate communication with the message handler core circuitry 102 across the hardware-software interface 128.

The interrupt controller circuitry 212 includes hardware, software, firmware, and/or a combination thereof, that supports various functionality associated with receiving and processing interrupts as generated by the interrupt generator 326 (further described in relation to FIG. 3) on the interrupt transmission lines 328. The interrupt transmission lines 328 may be utilized to initialize the start of transmission of a new transmit message, indicate a write request from the transmit FIFO, initialize the start of receipt of a receive message, indicate the reception of header and timestamp words, notify of errors, and so on. In some embodiments, the interrupt controller circuitry 212 may transmit such indicators, for example on the application memory interface 506 through the shared application memory interface circuitry 214, facilitating the transmission and receipt of messages on the communication bus 110.

Figure 5:
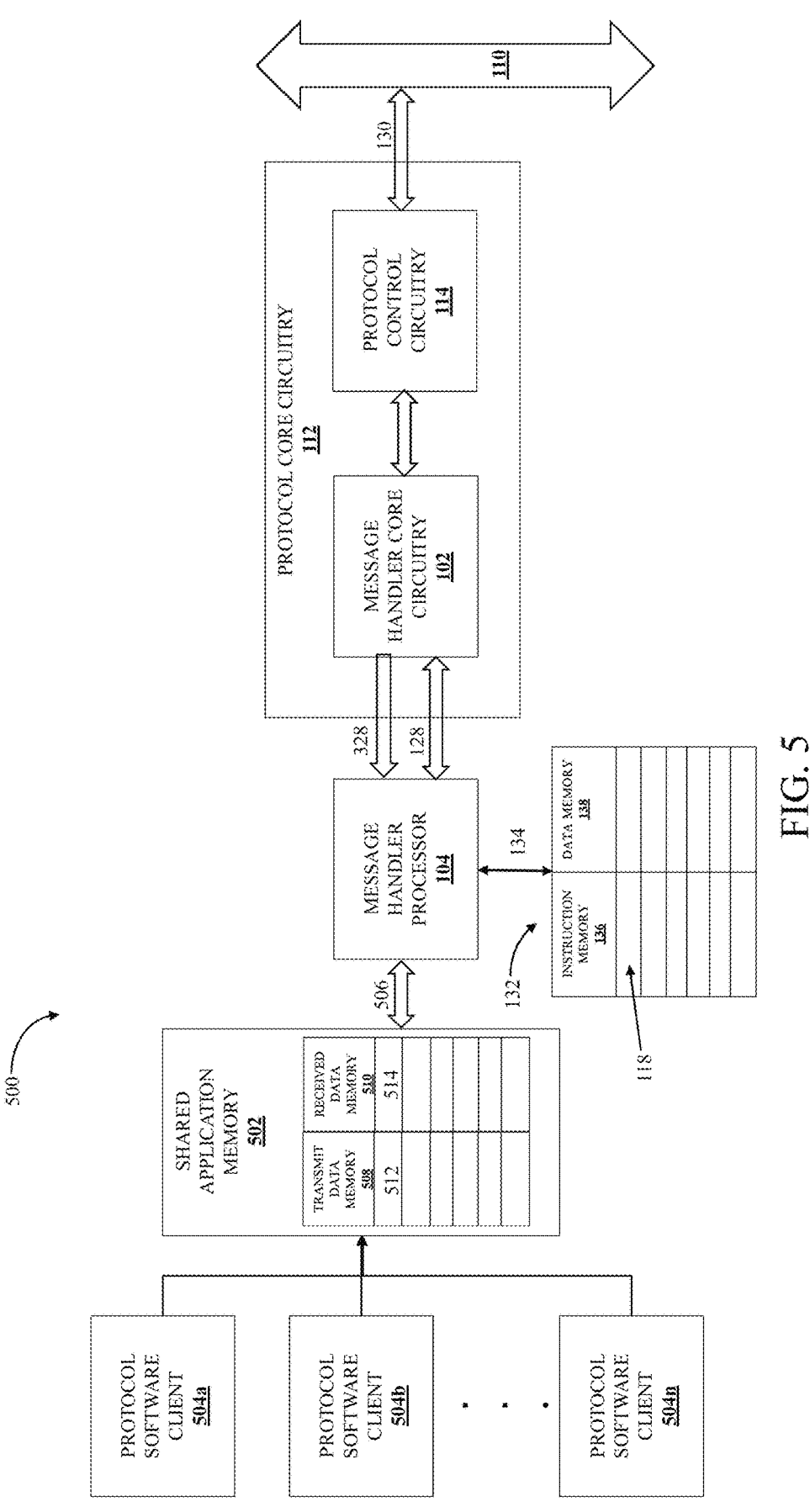
FIG. 5 depicts an example message-based protocol interface comprising a plurality of protocol software clients in accordance with an example embodiment of the present disclosure.

The shared application memory interface circuitry 214 includes hardware, software, firmware, and/or a combination thereof, that supports various functionality associated with receiving and processing data signals to and from the shared application memory 502 via the application memory interface 506 (as further described in relation to FIG. 5). In some embodiments, the message handler processor 104 may utilize the shared application memory interface circuitry 214 to receive and transmit data, including transmit messages destined for the communication bus 110 and received messages originating from the communication bus 110. In addition, in some embodiments, the message handler processor 104 may utilize shared application memory interface circuitry 214 to send and receive signals facilitating the coordination of the transmission of transmit messages destined for the communication bus 110. For example, data signals related to the queueing and prioritization of transmit messages.

Additionally or alternatively, in some embodiments, one or more of the sets of circuitry 202-214 are combinable. Additionally or alternatively, in some embodiments, one or more of the sets of circuitry perform some or all of the functionality described associated with another component. For example, in some embodiments, one or more sets of circuitry 202-214 are combined into a single module embodied in hardware, software, firmware, and/or a combination thereof. Similarly, in some embodiments, one or more of the sets of circuitry, for example message handler core interface circuitry 210, interrupt controller circuitry 212, and/or shared application memory interface circuitry 214 is/are combined such that the processor 202 performs one or more of the operations described above with respect to each of these circuitry individually.

Referring now to FIG. 3, example protocol core circuitry 112 is provided. As depicted in FIG. 3, the example protocol core circuitry 112 includes message handler core circuitry 102 comprising transmit (TX) message buffer controller circuitry 324 electrically connected to memory and direct memory access (DMA) interface circuitry 316, priority decoder circuitry 302, transmit handler circuitry 304, and an interrupt generator 326; the TX message buffer controller circuitry 324 comprising at least one transmit message buffer 106 configured to store a transmit message portion 124 and a buffer status generator 322 for each transmit message buffer 106. As further depicted in FIG. 3, the priority decoder circuitry 302 is additionally electrically connected to the transmit handler circuitry 304. The transmit handler circuitry 304 is additionally electrically connected to the protocol control circuitry 114 via the protocol control transmit interface 116a. In addition, as depicted in FIG. 3, the message handler core circuitry 102 further includes a transmit FIFO 306 storing a selected message payload 310. The transmit FIFO 306 is electrically connected to the hardware-software interface 128 through memory and DMA interface circuitry 316 and error correction circuitry 308, the memory and DMA interface circuitry 316 being further electrically connected to a register bank. In addition, the message handler core circuitry 102 includes a receive FIFO 312 storing a received message payload 314 and further electrically connected to receive handler circuitry 320 which is subsequently connected to the protocol control circuitry 114 through the protocol control receive interface 116b. As further depicted in FIG. 3, the receive FIFO 312 is electrically connected to the hardware-software interface 128 through memory and DMA interface circuitry 316 and error correction circuitry 308. The message handler core circuitry 102 further includes a receive message buffer 108 storing a received message portion, electrically connected to the receive handler circuitry 320, and electrically connected to the hardware-software interface 128 through memory and DMA interface circuitry 316 and error correction circuitry 308. As further depicted in FIG. 3, the interrupt generator circuitry produces output on interrupt transmission lines 328.

As depicted in FIG. 3, the example protocol core circuitry 112 includes error correction circuitry 308 and memory and DMA interface circuitry 316 which may be utilized to facilitate transfer of data between the protocol core circuitry 112 and the message handler processor 104 and connected memory block 132.

Many data storage devices (e.g., memory block 132) provide mechanisms to ensure the reliability of stored data (e.g., transmit messages 512, buffered receive messages 514). In some embodiments, error correction circuitry 308 may facilitate the correction of stored data when the data is transmitted from the message handler processor 104 to the protocol core circuitry 112. In some embodiments, the error correction circuitry 308 may utilize a Reliability, Availability, and Serviceability (RAS) scheme, such as Error Correction Code (ECC). Utilizing ECC, data transmitted from a data storage device may be corrected before transmission.

In addition, the example protocol core circuitry 112 includes memory and DMA interface circuitry 316. Memory and DMA interface circuitry 316 may enable the protocol core circuitry 112 to read and write data (e.g., transmit and receive messages) from and to a data storage device (e.g., transmit data memory 508 and received data memory 510 as described in relation to FIG. 5). The memory and DMA interface circuitry 316 may provide address decoding and memory mapping functionality to facilitate reading and writing data from a connected data storage device. In some embodiments, the memory and DMA interface circuitry 316 may support DMA capabilities, enabling the message handler core circuitry 102 to write directly to a connected memory device (e.g., transmit data memory 508 and received data memory 510).

As further depicted in FIG. 3, the message handler core circuitry 102 may further include transmit (TX) message buffer controller circuitry 324. The transmit (TX) message buffer controller circuitry 324 comprises at least one transmit message buffer 106 configured to store a transmit message portion 124 and a buffer status generator 322 for each transmit message buffer 106. The transmit message buffer 106 may be four of more 32-bit words. Out of these four or more words, two words are used for storing the header information of the transmit message which comprises a priority ID, payload size, message type, and other header information sent during transmission over communication bus interface 130 via protocol control circuitry 114. The remaining two or more words may comprise payload data words or other information like an address field specified particularly in the CAN-XL protocol standard. Importantly, not all the payload data words are stored in the transmit message buffer 106. There may be as many as 512 data words, but the transmit message buffer 106 can store only a few payload data words. Utilizing a transmit message buffer 106 of limited size allows a message-based protocol interface 300 to save storage area for multiple transmit message buffers 106. The transmit FIFO 306 may be used for the storage of the remaining payload data words for the selected higher priority message among the transmit message buffers 106 as determined by the priority decoder circuitry 302 as explained herein. The size of transmit message buffers 106 is controlled at the time of intellectual property (IP) core design and may be derived from the latency requirements of the message-based protocol to serve the next payload data write time by the message handler processor 104 into transmit FIFO 306.

As further depicted in FIG. 3, the message handler core circuitry 102 may further include priority decoder circuitry 302. Priority decoder circuitry 302 may be any hardware component or plurality of hardware components configured to select a message to be transmitted on the communication bus 110 based on a message ID contained in the plurality of transmit message buffers 106. In some embodiments, a portion of the transmit message may be written to an available transmit message buffer 106 by the message handler processor 104 based on the priorities of the transmit messages priorities. In an instance in which the protocol control circuitry 114 becomes available to transmit a message to the communication bus 110, the priority decoder circuitry 302 may read the transmit message priority from each transmit message portion 124 contained in the plurality of transmit message buffers 106. The priority decoder circuitry 302 may indicate the selected message to the message handler processor 104. Once the selected message is indicated to the message handler processor 104, the payload of the selected message may be transferred from the transmit data memory 508 (as further described in relation to FIG. 5) via the hardware-software interface 128, and through the error correction circuitry 308 to the transmit FIFO 306. Priority decoding takes place among the various types of messages, for example CAN protocol Classic CAN messages are of a higher priority than CAN-FD and CAN-XL, while CAN-FD messages are of a higher priority than CAN-XL. For the same protocol type (e.g., Classic CAN, CAN-FD) the priority decoding takes place based on a message ID. The lower the value of the message ID, the higher the priority. Thus, the lowest type or the lowest Message ID message is transmitted first by transmit handler circuitry 304 to the protocol control circuitry 114. Buffer status codes may be used to facilitate the update of the data contained in the transmit FIFO 306 with higher priority data from a higher priority message, even after the selected transmit message is selected by the priority decoder circuitry 302 for next transmission. Such an instance may occur when the message handler processor 104 receives the higher priority message having a higher priority than the selected transmit message which is selected by the priority decoder circuitry 302 for next transmission. An update of the selected transmit message selected by the priority decoder circuitry 302 can happen only before the start of transmission of the selected transmit message to protocol control circuitry 114. Further explanation of the buffer status codes is provided herein.

For example, in some embodiments, the message handler core circuitry 102 may include two transmit message buffers 106. The first transmit message buffer may contain a portion of a transmit message having a transmit message priority of 3. The second transmit message buffer may contain a portion of a transmit message having a transmit message priority of 5. In an instance in which a lower transmit message priority indicates a higher priority message, the transmit message associated with the transmit message portion 124 in the first transmit message buffer may be transmitted to the transmit FIFO 306 when the protocol control circuitry 114 indicates availability for a transmit message. By staging a portion of the transmit message in the plurality of transmit message buffers 106 until the protocol control circuitry 114 indicates an availability to send, the protocol core circuitry 112 may meet the timing restrictions of the message-based protocol while minimizing the size and cost of the protocol core circuitry 112.

The priority decoder circuitry 302 may comprise physical components such as logic gates, transistors, registers, look-up tables, flip-flops, and/or similar hardware components. The priority decoder circuitry 302 may be designed and implemented at the register-transfer level of abstraction by modeling the flow of digital signals between hardware registers and logic gates. In some embodiments, the priority decoder circuitry 302 may be implemented as a field-programmable gate array (FPGA), application-specific integrated circuit (ASIC), or integrated circuit (IC).

As further depicted in FIG. 3, each of the plurality of transmit message buffers 106 may be electrically connected with a buffer status generator 322. A buffer status generator 322 may comprise circuitry configured to generate a buffer status code based on the state of the associated transmit message buffer 106. A buffer status code may indicate to the message handler processor 104 the state of the transmit message buffer 106. For example, a buffer status code may indicate that a transmit message buffer 106 is available and may be updated with a new transmit message portion 124 of a transmit message in shared application memory awaiting transmission. A buffer status code may also indicate the transmit message portion 124 contained in the transmit message buffer 106 has been written and is awaiting transmission. A buffer status code may also indicate that a transmit message buffer 106 is locked for transmission, indicating the transmit message associated with the transmit message buffer 106 is in transmission. A buffer status code may further indicate a message in transmission has encountered an error during transmission and is scheduled for retransmission. A buffer status code may further indicate a message encountered an error during transmission and is being retransmitted. The message handler processor 104 may read the buffer status code of each transmit message buffer 106 to determine when the next transmit message may be transmitted to an available transmit message buffer 106.

Buffer status codes (BSC) generated by the buffer status generator 322 are generated in a unique way to support the update mechanism of the message-based communication protocol while avoiding certain race conditions that may occur, for example, both the message handler processor 104 and the transmit handler circuitry 304 attempt to access and/or manipulate the same transmit message indicated in the transmit message buffer 106. One example may occur when the message selected by the priority decoder circuitry 302 and stored in the transmit FIFO 306 is requested by the transmit handler circuitry 304 for transmission simultaneous with the message handler processor 104 attempting to override the data pertaining to the selected message in the transmit FIFO, because the message handler processor 104 has received another higher priority message having a higher priority than the message selected from the transmit message buffer 106. In one example embodiment, buffer status codes such as FREE, VALID, LOCKED, RETRY_VALID and RETRY_LOCKED may be utilized. In some embodiments, the set of buffer status codes may be used for each transmit message buffer 106. A FREE BSC may be set for a transmit message buffer 106 when the transmit message buffer 106 is free to be updated by the message handler processor 104. The BSC may transit to VALID when the header information of a transmit message is completely written by the message handler processor 104 into the transmit message buffer 106. The BSC may transit to VALID based on the message type. For example, for the CAN protocol a BSC may transit to VALID as per following rules: (1) For Remote Frame of Classic CAN write operations to first 2 words following the transmit order; (2) For Classic and CAN-FD messages for which payload data is 0 byte (data length code (DLC)=0), update of first 2 words; (3) For Classic and CAN-FD messages for which payload data is less than or equal to 4 byte (DLC<=4), update to first 3 words; (4) For Classic and CAN-FD messages for which payload data is greater than 4 byte (DLC>4), update of all 4 or more words of 106; (5) For CAN-XL message, update of all 4 or more words. The BSC may transit to LOCKED when the transmit handler circuitry 304 starts the transmission of the transmit message from the selected transmit message buffer 106. The BSC may transit to RETRY_VALID when a transmit message in-transit from the transmit FIFO 310 has encountered error during transmission and is scheduled for retransmission. The BSC may transit to RETRY_LOCKED when a message which encountered error during transmission and in a RETRY_VALID state, is retransmitted. In accordance with the example BSC scheme, in an instance in which the message handler processor 104 intends to update a particular transmit message buffer 106, the message handler processor 104 may first UNLOCK the target transmit message buffer 106.

In the support of the overriding functionality of the message-based protocol, there may be a possibility of a race condition when a transmit message in the transmit FIFO 306 is about to go in-transmission and the message handler processor 104 simultaneously attempts to update the transmit FIFO 306 and/or transmit message buffer 106 associated with the transmit message, with another higher priority transmit message. To mitigate the corruption of the data associated with the transmit message during transmission, a unique method of message buffer update is implemented. A software-programmable message buffer request bit for each transmit message buffer 106 indicating a request to update the transmit message buffer 106, along with the BSC may be utilized to solve such a race condition. For example, the message handler processor 104 may first check the BSC value of the targeted transmit message buffer 106. If the BSC of the target transmit message buffer 106 is VALID, the message handler processor 104 first writes the message buffer update request bit, after which, the message handler processor 104 again reads the value of the BSC for the targeted transmit message buffer 106. In an instance in which the BSC of the target transmit message buffer 106 has been updated to FREE, the message handler processor 104 may start the transmission, updating the transmit message buffer 106. However, in an instance in which the BSC has been updated to LOCKED, indicating to the message handler processor 104 that the transmit handler circuitry 304 has started the transmission of the message contained in the transmit message buffer 106, then the message handler processor 104 may not update the target transmit message buffer 106 and waits for next opportunity.

Figure 4:
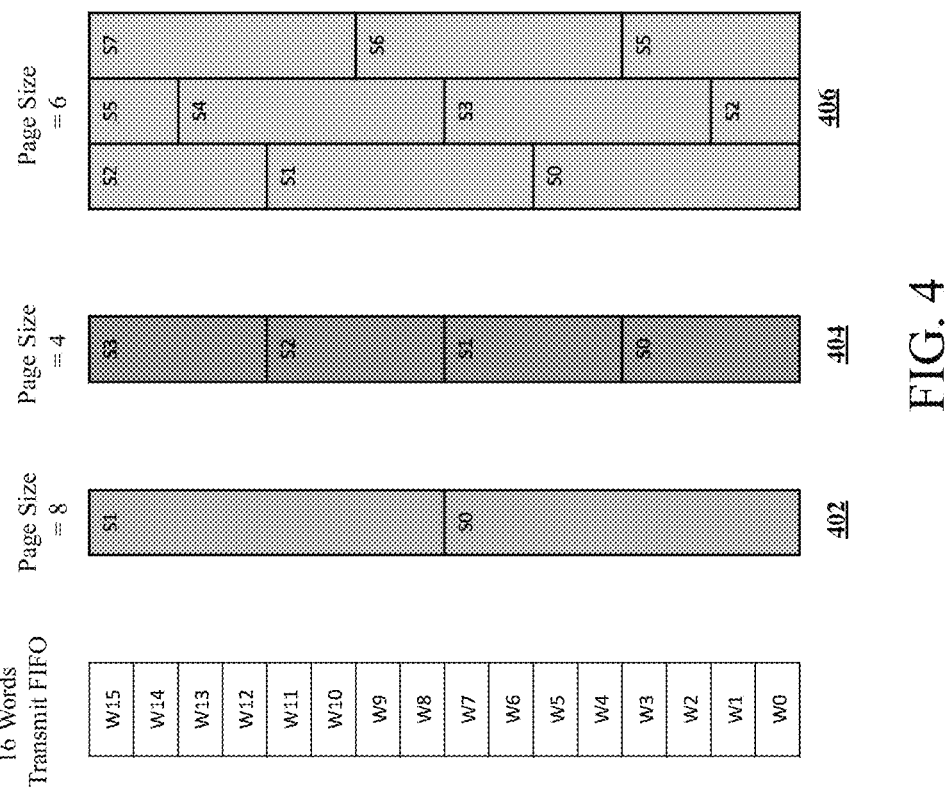
FIG. 4 depicts example page sizing for a transmit FIFO in accordance with an example embodiment of the present disclosure.

As further depicted in FIG. 3, the example protocol core circuitry 112 may include a transmit FIFO 306. The transmit FIFO 306 may be any memory cell or block of memory cells configured to store at least a portion of a transmit message (e.g., selected message payload 310) to be transmitted on the communication bus 110. For example, in some embodiments, the transmit FIFO 306 may comprise one or more memory cells forming registers, flip-flops, look-up tables, and other similar memory devices. In some embodiments, to conserve memory resources in hardware, the transmit FIFO 306 may only include enough data storage space to store a portion of the transmit message payload. For example, in the CAN-XL message-based protocol, the size of one transmit message 512 may be as big as 2048 bytes, however, the transmit FIFO 306 may be as little as 16 words or 64 bytes. FIG. 4 provides further detail in relation to unique paging schemes in the implementation of the transmit FIFO 306.

As described herein, when the message handler core circuitry 102 selects a transmit message to be transmitted on the communication bus 110, such as through the priority decoder circuitry 302, the remaining portion of the transmit message may be transmitted to the transmit FIFO 306 and stored, for example, as the selected message payload 310 in pages. From the transmit FIFO 306 and/or the corresponding transmit message buffer 106, the transmit message may be transmitted through the transmit handler circuitry 304 to the communication bus 110.

As further depicted in FIG. 3, the example message handler core circuitry 102 includes transmit handler circuitry

304. The transmit handler circuitry 304 may be any hardware component or plurality of hardware components configured to receive an indication of the highest priority message contained in the plurality of transmit message buffers 106 from the priority decoder circuitry 302 and transmit the associated transmit message portion 124 and selected message payload 310 to the protocol control circuitry 114 via the protocol control transmit interface 116*a*. In some embodiments, the transmit handler circuitry 304 may send and receive signals to the protocol control circuitry 114 to initiate and acknowledge transmission of stored transmit messages. In addition, in some embodiments, the transmit handler circuitry 304 may receive indication of the availability of the protocol control circuitry 114 to receive a transmit message through the protocol control transmit interface 116*a*. In an instance in which the protocol control circuitry 114 is available, the transmit handler circuitry 304 may transmit the transmit message portion 124 contained in one of the plurality of transmit message buffers 106 having the highest priority transmit message priority to the protocol control circuitry 114. Further, the transmit handler circuitry 304 may subsequently transmit the selected message payload 310 stored in the transmit FIFO 306 and associated with the same transmit message to the protocol control circuitry 114.

The transmit handler circuitry 304 may comprise physical components such as logic gates, transistors, registers, look-up tables, flip-flops, and/or similar hardware components. The transmit handler circuitry 304 may be designed and implemented at the register-transfer level of abstraction by modeling the flow of digital signals between hardware registers and logic gates. In some embodiments, the transmit handler circuitry 304 may be implemented as a field-programmable gate array (FPGA), application-specific integrated circuit (ASIC), or integrated circuit (IC).

As further depicted in FIG. 3, the example message handler core circuitry 102 includes an interrupt generator 326. The message handler core circuitry 102 may utilize an interrupt generator 326 to coordinate transmission and receipt of message-based protocol messages by generating and transmitting outputs on the interrupt transmission lines 328. For example, in some embodiments, interrupts may be transmitted to the message handler processor 104 to initiate transmission of a new transmit message, to indicate availability of space within the transmit FIFO 306, coordinate reception of a new message, notify connected components of transmission errors, and similar notifications. The interrupt generator 326 may comprise physical components such as logic gates, transistors, registers, look-up tables, flip-flops, and/or similar hardware components. The interrupt generator 326 may be designed and implemented at the register-transfer level of abstraction by modeling the flow of digital signals between hardware registers and logic gates.

As further depicted in FIG. 3, the example message handler core circuitry 102 includes receive handler circuitry 320. The receive handler circuitry 320 may be any hardware component or plurality of hardware components configured to receive from the protocol control circuitry 114 via the protocol control receive interface 116*b* a received message and store the received message portion 318 of the received message in one of a plurality of receive message buffers 108 and a receive message payload 314 in the receive FIFO 312. In some embodiments, the receive handler circuitry 320 may send and receive signals to the protocol control circuitry 114 to acknowledge transmission of received messages.

The receive handler circuitry 320 may comprise physical components such as logic gates, transistors, registers, look-up tables, flip-flops, and/or similar hardware components. The receive handler circuitry 320 may be designed and implemented at the register-transfer level of abstraction by modeling the flow of digital signals between hardware registers and logic gates. In some embodiments, the receive handler circuitry 320 may be implemented as a field-programmable gate array (FPGA), application-specific integrated circuit (ASIC), or integrated circuit (IC).

As further depicted in FIG. 3, the example message handler core circuitry 102 includes a plurality of receive message buffers 108 including at least a received message portion 318 and receive FIFO 312 comprising a received message payload 314. The receive FIFO 312 may be any memory cell or block of memory cells configured to store at least a portion of a received message (e.g., received message payload 314) received from the receive handler circuitry 320. In some embodiments, the receive FIFO 312 may comprise one or more memory cells forming registers, flip-flops, look-up tables, and other similar memory devices. To preserve hardware resources, in some embodiments, the receive FIFO 312 may only include enough data storage space to store a portion of one received message. For example, in the CAN-XL message-based protocol, the size of one received message may be as big as 2048 bytes, however, in some embodiments, the receive FIFO 312 may be configured to store only 8 or 16 words (32 or 64 bytes).

Referring now to FIG. 4, a diagram illustrating unique paging schemes that may be utilized by a transmit FIFO 306 is provided. In some embodiments, a message-based protocol interface may be configured such that the storage space of transmit FIFO 306 is smaller than the size of a max transmit message. For example, the transmit FIFO depicted in FIG. 4 may store up to 16 words or 64 bytes, however, the max payload size of a CAN-XL message is 2048 bytes. In order to transmit a transmit message having the max payload size, the transmit FIFO 306 may be filled by the message handler processor 104 in multiple smaller steps. The length of the request time to perform the smaller steps may be tuned using a new page size concept (e.g., paging scheme). Software running on the message handler processor 104 may program a step_size in storage registers, for example in the register bank, of the message handler core circuitry 102. Requests for additional payload data of the transmit message may be sent to the message handler processor 104 via interrupts generated by the interrupt generator 326 or, in some embodiments, requests may be sent to a DMA controller, for example as part of the memory and DMA interface circuitry 316. Whether to operate using an interrupt or a DMA request selection may be configurable. For a given message-based protocol interface, a step_size value may be derived based on an interrupt handling latency associated with the message handler processor 104 and further based on a round trip data update delay added by the data read-write path from the message handler processor 104 to the protocol control circuitry 114. The step_size value may change from one system to another based on parameters of the processor and/or integration parameters of the IP (e.g., message handler core circuitry 102/protocol control circuitry 114).

In accordance with such constraints the page size concept may improve the performance of the message-based protocol interface by improving the efficiency of the update of the transmit FIFO 306. The page size concept may work on the early generation of a data update request without waiting for the data transmission to reach a particular location in the transmit FIFO 306. The common approach in general FIFO implementations is known as an update request based on a threshold value. In the page size concept, as shown in FIG.

4, any step_size value less than the size of the transmit FIFO 306 may be selected. At a point at which there are empty locations in the transmit FIFO 306 equaling or greater than the selected step_size as programmed in the page_size register, the interrupt or DMA request for additional transmit data may be sent. A message handler link layer running on the message handler processor 104 may service the interrupt (or when enabled the DMA services the request) to transmit the next page of the selected transmit message data into the transmit FIFO 306. Utilizing the page size concept, the transmission of a transmit message may be tuned for the most efficient utilization for a message-based protocol interface. For example, in some embodiments, a step_size value of 4 may be used. In such an embodiment, due to the small transmission size, the update request may be scheduled after a short time. However, using a page size concept having a step_size of 8, the message handler processor 104 may fill the transmit FIFO 306 four times initially and then in the steps of 4 words on the trigger of each interrupt, indicating additional data of the transmit message may be received. Utilizing a larger step_size, due to unexpected latency or bandwidth starvation, the update may not be delayed as there is enough payload data available in the transmit FIFO 306 to sustain the message transmission. Utilizing various step_sizes the peak latency may be managed. While, after expiration of peak latency duration, the message handler processor 104 would serve the interrupt requests back to back and write all the required data words without waiting for next interrupt.

Importantly, there is no clear interrupt bit in the page size concept. The generated interrupt is cleared by the message handler core circuitry 102 and circuitry associated with the transmit FIFO 306 when there are fewer empty locations in the transmit FIFO 306 then the programmed value of step_size. In this way, the available space in the transmit FIFO 306 may be fully utilized in a given scenario. According to the same philosophy, other step_size values may work. As depicted in FIG. 4, scheme 402 utilizes a page size of 8 words, scheme 404 utilizes a page size of 4 words, and scheme 406 utilizes a page size of 6 words. Once the number of empty locations available in the transmit FIFO is equal to or greater than the page size, an interrupt may be sent to the message handler processor 104, triggering the transmission of a new page of the transmit message into the transmit FIFO.

Referring now to FIG. 5, an example message-based protocol interface 500 is provided. As depicted in FIG. 5, the example message-based protocol interface 500 includes the message handler processor 104 electrically connected to the protocol core circuitry 112 via the hardware-software interface 128. In addition, the message handler processor 104 receives interrupts from the protocol core circuitry 112 via the interrupt transmission lines 328. The message handler processor 104 is additionally electrically connected to the memory block 132 through the memory interface 134. As further depicted in FIG. 5, the message handler processor 104 is electrically connected to a shared application memory 502 comprising a transmit data memory 508 storing transmit messages 512 and a received data memory 510 storing received messages 514 via an application memory interface 506. The shared application memory 502 is further electrically connected to a plurality of protocol software clients (e.g., protocol software client 504a-504n).

As depicted in FIG. 5, the example message-based protocol interface 500 includes a shared application memory 502. The shared application memory 502 may be any memory cell or block of memory cells accessible to both the plurality of protocol software clients 504a-504n and the message handler processor 104, such that data and messages may be written and read by either the message handler processor 104 and the protocol software client 504a-504n. Utilizing a shared application memory 502 may enable a plurality of protocol software clients 504a-504n to share a single interface with the communication bus 110 through a single instance of protocol core circuitry 112. The shared application memory 502 may further an acceptance filtering database as described in relation to FIG. 7.

Figure 8:
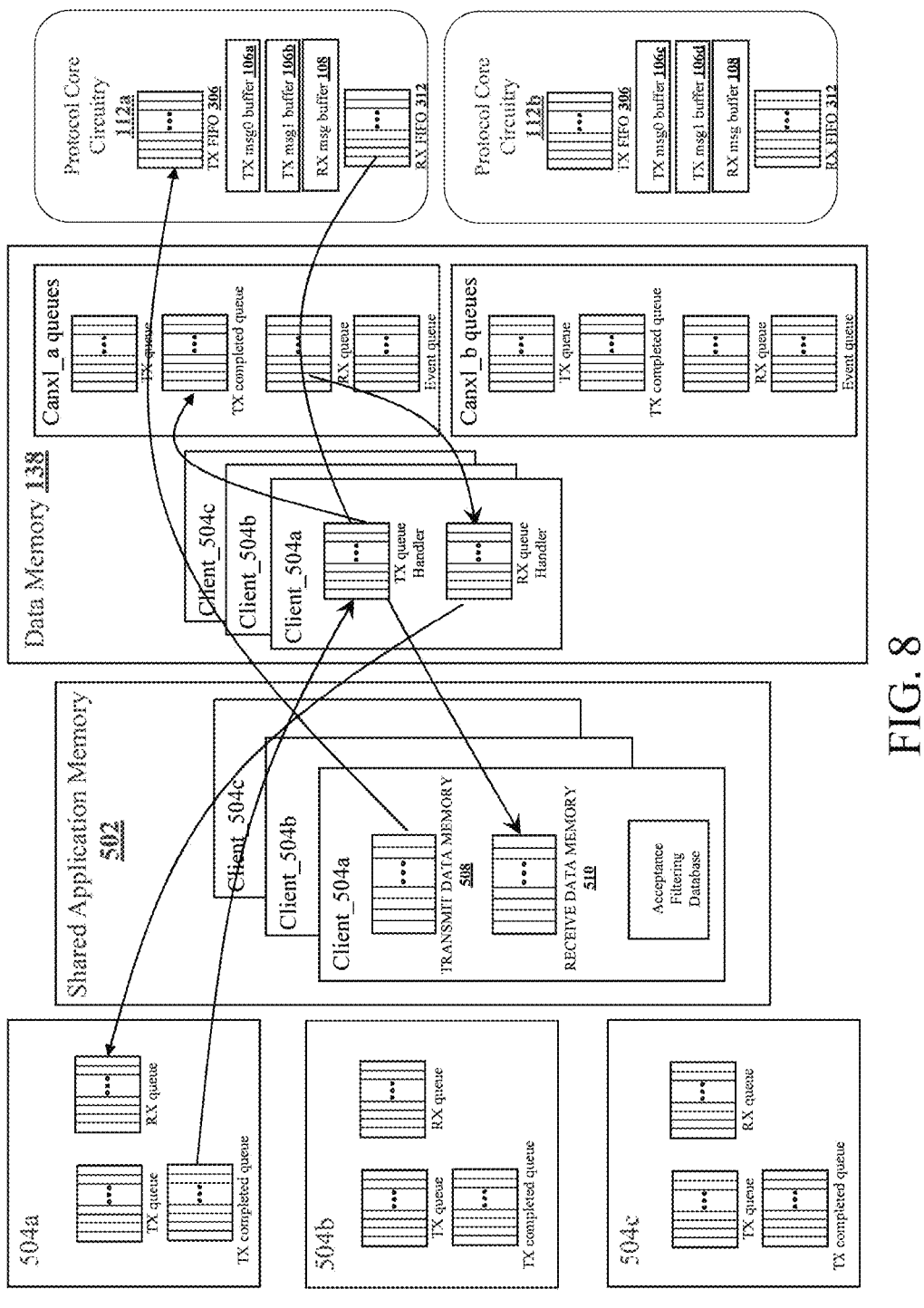
FIG. 8 illustrates an example data flow for an example message-based protocol interface in accordance with an example embodiment of the present disclosure.

As further depicted in FIG. 5, the shared application memory 502 includes a transmit data memory 508. The transmit data memory 508 may include a plurality of transmit messages 512. In some embodiments, the transmit messages 512 may be stored in the transmit data memory 508 while awaiting transmission by the message handler core circuitry 102 to the transmit message buffer 106 and transmit FIFO 306 of the message handler core circuitry 102. In some embodiments, the transmit messages 512 may be stored in a form compatible with the particular message-based protocol, such as CAN or CAN-XL. In some embodiments, a transmit message 512 may be stored in an alternative protocol, for example, ethernet. In some embodiments, transmit messages 512 stored in alternative protocol may be transmitted or tunneled on the communication bus 110 to other connected devices. In some embodiments, the shared application memory 502 may maintain a transmit data memory 508 for each protocol software client 504a-504n, as depicted in FIG. 8. In some embodiments, the transmit data memory 508 may store the transmit messages 512 in a queue or FIFO according to priority.

In some embodiments, the message handler processor 104 may store a portion of the transmit message 512 in the data memory 138 to facilitate the prioritization of the transmit messages 512 in the transmit data memory 508 for a particular protocol software client 504a-504n. For example, the transmit messages 512 may include a header portion. A header portion may comprise metadata indicating information about the transmit message. For example, priority, payload size, source, destination, a message identifier (ID), and/or other similar data. The message handler processor 104 may utilize and/or store all or part of the header portion of the transmit message 512 to determine priority of the transmit messages 512.

A transmit message 512 may further include a payload portion including the data content of the transmit message 512. In some embodiments, in an instance in which a transmit message 512 has reached the front of the queue in the transmit data memory 508, at least a part of the header portion may be transmitted to the message handler core circuitry 102 for storage in the transmit message buffer 106 prior to transmission of the transmit message 512 on the communication bus 110. In some embodiments, the message handler core circuitry 102 may utilize the metadata contained in the header portion to determine the priority of messages transmitted, as further described in relation to FIG. 3.

As further depicted in FIG. 5, the shared application memory 502 includes a received data memory 510. The received data memory 510 may include a plurality of buffered receive messages 514. In some embodiments, the buffered receive messages 514 may be stored in the received data memory 510 while awaiting transmission to one or more clients (e.g., protocol software client 504a-504n). In some embodiments, the buffered receive messages 514 may be stored in a form compatible with the particular message-based protocol, such as CAN or CAN-XL. In some embodiments, a buffered receive message 514 may be stored in an alternative protocol, for example, ethernet. In some embodiments, the buffered receive messages 514 may be decoded and/or comprise the payload data. In addition, the buffered receive messages 514 may contain one or more message IDs indicating the type, destination, and/or source of the buffered receive message 514.

As further depicted in FIG. 5, the message-based protocol interface may service a plurality of protocol software clients 504a-504n. Each protocol software client 504a-504n may implement application software to control the operation of the client. Operation of the software client may include transmission and receipt of messages on the communication bus 110. Each protocol software client 504a may further include a raw buffer handler as further described in relation to FIG. 7. By managing the transmission and receipt of messages for multiple protocol software clients 504a-504n by storing messages in a shared application memory 502 and coordinating the transmission and receipt of messages with the message handler processor 104, the message-based protocol interface may comply with and exceed any latency and timing requirements of the protocol while minimizing the hardware resources utilized by the interface.

Figure 6:
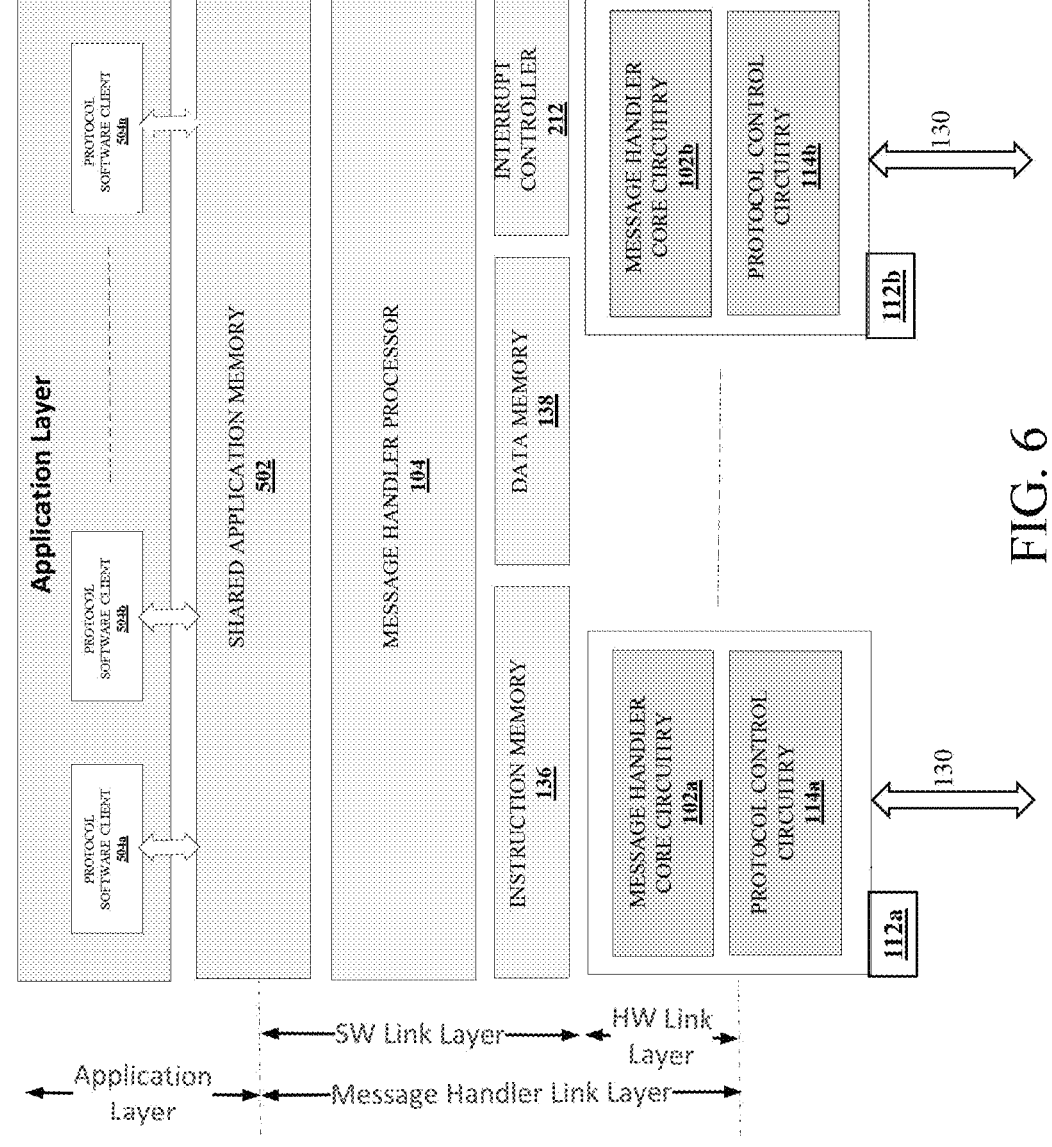
FIG. 6 depicts example layer architecture for an example message-based protocol interface in accordance with an example embodiment of the present disclosure.

Referring now to FIG. 6, an example layer architecture for an example message-based protocol interface is provided. As depicted in FIG. 6, the message-based protocol interface comprises an application layer comprising a plurality of protocol software clients 504a-504n. The plurality of protocol software clients 504a-504n of the application layer, in some embodiments, may utilize a shared application memory 502 bridging the gap between the application layer and the software link layer. The software link layer may further comprise the message handler processor 104 managing the interaction between the shared application memory 502 and the one or more protocol core circuitries 112a, 112b, utilizing the instruction memory 136, the data memory 138, and the interrupts received at the interrupt controller 212. As depicted in FIG. 6, a message handler processor 104 may coordinate the transmission and receipt of messages on multiple protocol core circuitries 112a, 112b. As further depicted in FIG. 6, the hardware link layer comprises the protocol core circuitry 112a, 112b including the message handler core circuitry 102a, 102b and the protocol control circuitry 114a, 114b. Each protocol core circuitry 112a, 112b interfaces with the communication bus 110 via a communication bus interface 130.

Figure 7:
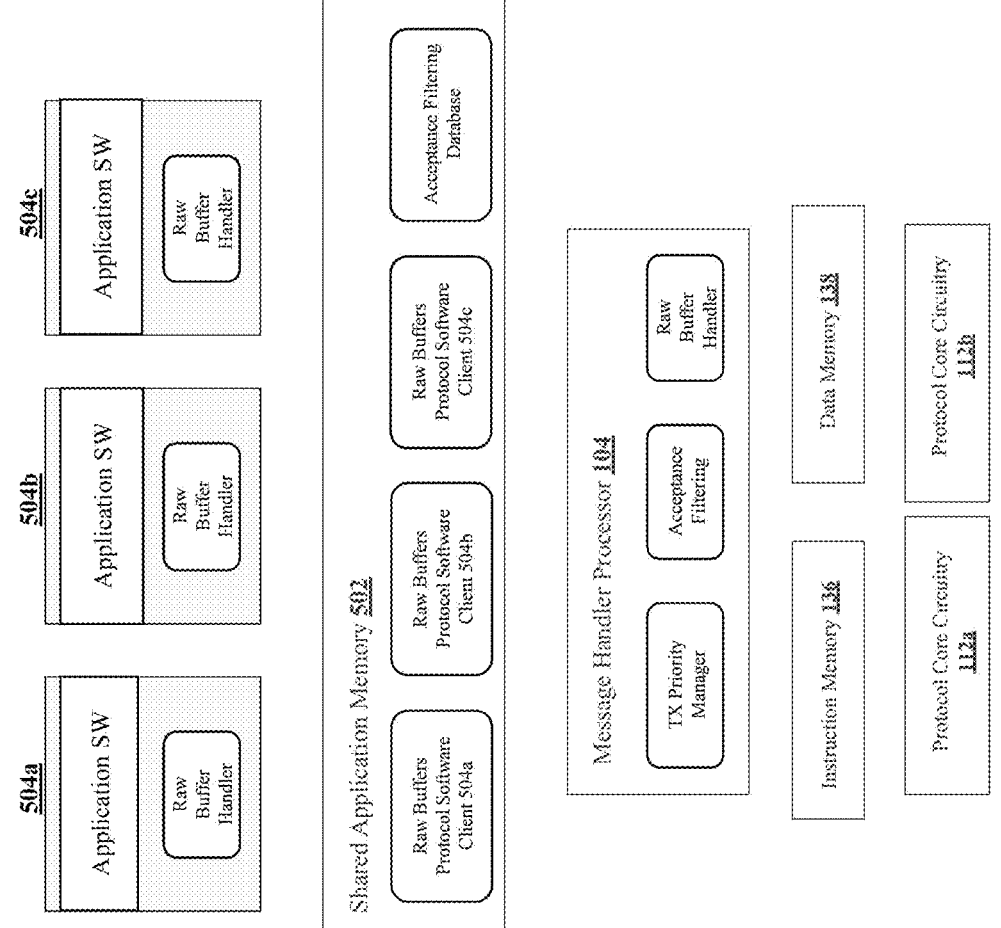
FIG. 7 illustrates an example block diagram representing the layer architecture for an example message-based protocol interface in accordance with an example embodiment of the present disclosure.

Referring now to FIG. 7, the layer architecture for an example message-based protocol interface is provided. As depicted in FIG. 7, the Application Layer comprises one or more protocol software clients 504a-504n. Each protocol software client may include a raw buffer handler. A raw buffer handler manages the interface of the protocol software client 504a-504n with the associated raw buffer in the shared application memory 502. For example, in an instance in which a protocol software client 504a-504n requires transmission of a transmit message, the raw buffer handler may store the transmit message in the raw buffer associated with the protocol software client 504a-504n and track the order and priority of all transmit messages contained in the raw buffer in shared application memory 502 associated with the protocol software client 504a-504n.

In addition to providing raw buffer storage for each of the protocol software clients 504a-504n, the shared application memory maintains an acceptance filtering database utilized by the acceptance filtering block of the message handler processor 104. Received messages may comprise an ID indicating the destination of the message. An acceptance filtering database may store an ID or other indicator of a message type of receive messages that may be accepted by the associated protocol software clients 504a-504n. For example, the acceptance filtering database may include a list of IDs indicating all message types that are accepted by at least one of the protocol software clients 504a-504n associated with the shared application memory 502. For each received message, the acceptance filtering block of the message handler processor 104 may compare the ID of the received message with the ID list of the acceptance filtering database. In an instance in which the ID of a received message does not match an ID contained in the acceptance filtering database, the received message may be rejected. Utilizing the shared application memory 502 to store acceptance IDs reduces the hardware resources necessary in the protocol core circuitry 112 of the message-based protocol interface.

As further depicted in FIG. 7, the message handler processor 104 further includes a TX priority manager. A message handler processor 104 may utilize data memory (e.g., data memory 138) to store at least a portion of the transmit messages contained in the raw buffers of the shared application memory 502. Based on the ID or type of the transmit message, the message handler processor 104 may determine the order the transmit messages are transmitted. The TX priority manager may notify the raw buffer handler of the next transmit message to be transmitted once the message handler core circuitry 102a, 102b indicates availability.

As further depicted in FIG. 7, the message handler processor 104 includes a raw buffer handler. A raw buffer handler, in some embodiments, may facilitate the transmission of data from the raw buffers in the shared application memory 502 to the transmit message buffers 106 and/or the transmit FIFO 306 of the message handler core circuitry 102a, 102b, once indicated by the TX priority manager.

Referring now to FIG. 8, an example data flow for an example message-based protocol interface is provided. As depicted in FIG. 8, the data memory 138 may include a transmit queue handler and a receive queue handler for each protocol software client 504a-504c utilizing the shared application memory 502. The data memory 138 may store a portion of each transmit message facilitating the determination of the priority of queued transmit messages. Once space in the transmit FIFO (e.g., transmit FIFO 306a, 306b) becomes available, the message handler processor 104 facilitates the transmission of data from the shared application memory 502 to the available transmit FIFO and/or the transmit message buffer (e.g., transmit message buffer 106a-106d). Once transmission is complete, the transmit queue handlers in both the data memory 138 of the message handler processor 104 and at the associated protocol software client 504a-504c, is updated. Similarly, in an instance in which a message is received at the protocol core circuitry, the received message is transmitted to the shared application memory 502 for the associated protocol software client 504a-504c, provided the received message complies with an accepted ID contained in the acceptance filtering database for the protocol software client 504a-504c.

Figure 9:
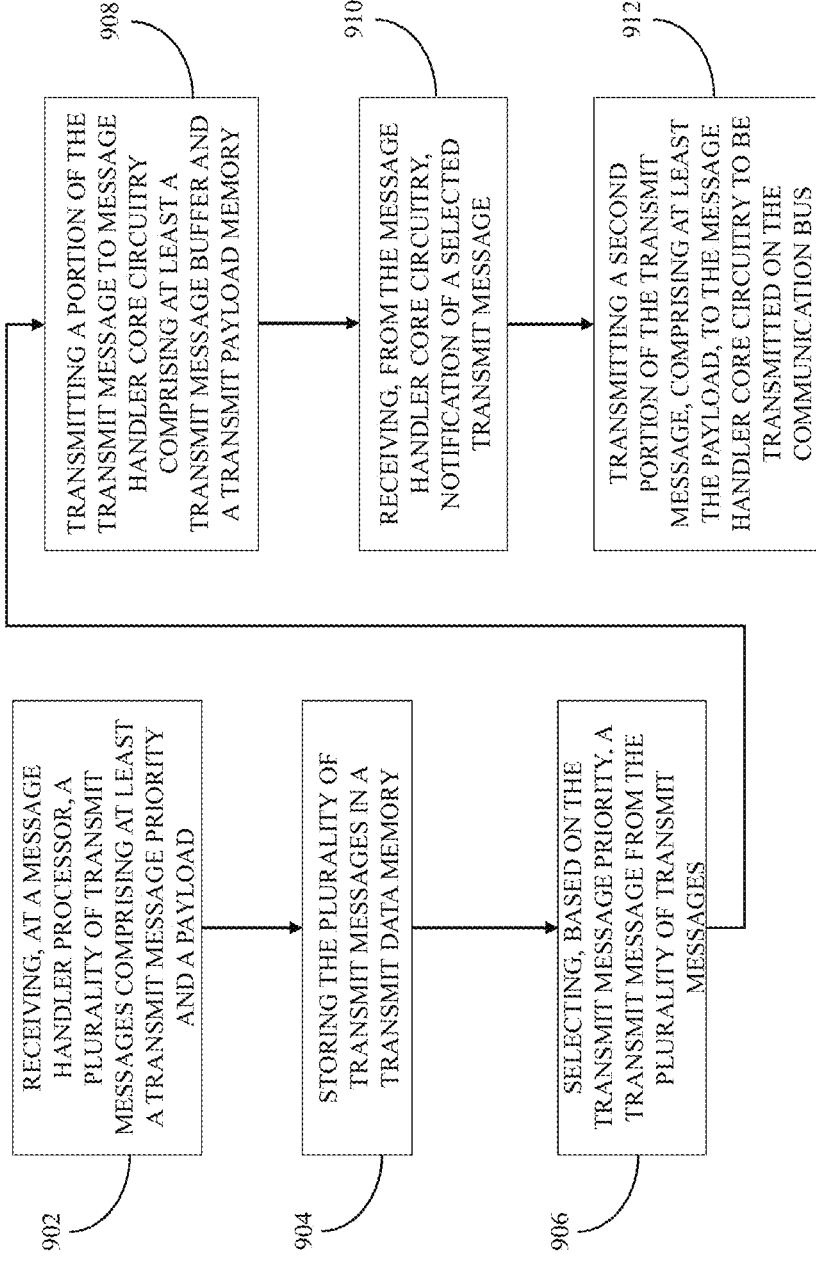
FIG. 9 illustrates a flowchart depicting an example method for transmitting messages on a communication bus in accordance with an example embodiment of the present disclosure.

Referring now to FIG. 9, an example flow diagram illustrating an example method 600 for transmitting messages on a communication bus (e.g., communication bus 110) in accordance with a message-based protocol (e.g., CAN-XL) is illustrated, in accordance with one or more embodiments of the present disclosure. At step 902, a message handler processor (e.g., message handler processor 104) receives a plurality of transmit messages (e.g., transmit message 512) comprising at least a transmit message priority and a payload, wherein the message handler processor comprises a processor (e.g., processor 202) and an instruction memory (e.g., instruction memory 136) including program code (e.g., program code 118). As described herein, the message handler processor may be implemented in software to provide greater flexibility in updating and modifying the functionality of the message handler processor. The message handler processor may receive a plurality of transmit messages from a plurality of software clients (e.g., protocol software client 504a-504n) utilizing a message-based protocol interface (e.g., message-based protocol interface 100, 100, 500) to transmit messages on a communication bus according to a message-based protocol. In some embodiments, the transmit messages may be stored in shared application memory (e.g., shared application memory 502) and the message handler processor may be notified on the presence of a transmit message.

A step 904, the message handler processor stores the plurality of transmit messages in a transmit data memory (e.g., transmit data memory 508). In some embodiments, the message handler processor, may store the plurality of transmit messages in a transmit data memory. The transmit messages may remain in the transmit data memory until selected for transmission on the communication bus.

At step 906, the message handler processor selects, based on the transmit message priority, a transmit message from the plurality of transmit messages. A transmit message may include a transmit message priority. The transmit message priority may indicate a priority based on the content of the transmit message, the source of the transmit message, the destination of the transmit message, or any other parameter related to the transmit message. Many message-based protocols, such as CAN-XL, support transmission of high priority messages over lower priority messages. As such, in some embodiments, the transmit message includes a transmit message priority indicating the priority of the specific transmit message. In some embodiments, the transmit message priority may be contained in a header or metadata section of the transmit message and may be identified by the message handler processor and other components of the message-based protocol interface. In some embodiments, the message handler processor may select the transmit message to be transmitted by comparing the transmit message priority of all messages stored in the transmit data memory and selecting the message with the highest transmit message priority to be transmitted.

At step 908, the message handler processor transmits a portion of the transmit message to message handler core circuitry (e.g., message handler core circuitry 102) comprising at least a transmit message buffer (e.g., transmit message buffer 106) and a transmit FIFO (e.g., transmit FIFO 306). As described in relation to FIG. 3, in some embodiments, the message handler core circuitry may include a transmit message buffer and a transmit FIFO. The message handler core circuitry may transmit a portion of the selected message to the message handler core circuitry. In some embodiments, the portion of the selected message may include metadata related to the selected transmit message, such as the transmit message priority, the payload size, the source of the message, the destination of the message, they type of data in the message, etc. Transmitting a portion of the selected transmit message including metadata may enable message handler core circuitry to determine a relative priority among the metadata portions of several transmit messages buffered in the message handler core circuitry.

The message handler core circuitry may include a plurality of transmit message buffers, however, the message handler processor may need to wait for an available transmit message buffer before transmitting the selected message. The transmit message buffer may in some embodiments, include a buffer status code (as described in relation to FIG. 1) indicating the current status of the plurality of transmit message buffers. In an instance in which a buffer status code indicates a transmit message buffer is available, the portion of the transmit message may be written to the available transmit message buffer. Many message-based protocols, including CAN-XL, support message overriding if a higher priority message is awaiting transmission. Thus, if no transmit message buffers are available, but the selected transmit message has a higher priority than a transmit message stored in one of the transmit message buffers, and the transmit message buffer is not locked during transmission, the message handler processor may overwrite the transmit message in the transmit message buffer.

At step 910, the message handler processor receives, from the message handler core circuitry, notification of a selected transmit message. Message handler core circuitry may determine the protocol control circuitry (e.g., protocol control circuitry 114) is ready for a transmit message. The message handler core circuitry may use a priority decoder (e.g., priority decoder circuitry 302) to determine a message from the transmit message portions contained in the plurality of transmit message buffers 106. For example, the priority decoder may select the message with the highest transmit message priority from the messages in the plurality of transmit message buffers. Once a message is selected for transmission, the message handler core circuitry may indicate to the message handler processor the selected message. The message handler core circuitry may indicate by asserting a signal, transmitting a value, or any other means.

At step 912, the message handler processor transmits a second portion of the transmit message, comprising at least the payload, to the message handler core circuitry to be transmitted on the communication bus. As described herein, the message handler core circuitry 102 may include a transmit FIFO (e.g., transmit FIFO 306) configured to store the payload of the selected transmit message for transmission on the communication bus. In some embodiments, the second portion of the transmit message may include the payload, or data associated with the transmit message. In some embodiments, the second portion of the transmit message stored in the transmit FIFO, and the portion of the transmit message stored in the transmit message buffer may comprise at least the complete transmit message. Transmitting the portion of the transmit message in the transmit message buffer and the second portion of the transmit message in the transmit FIFO consecutively may constitute a complete message in accordance with the message-based protocol.

While this detailed description has set forth some embodiments of the present invention, the appended claims cover other embodiments of the present invention which differ from the described embodiments according to various modifications and improvements. For example, one skilled in the art may recognize that such principles may be applied to any electronic device that transmits and receives data according to a message-based protocol. For example, sensing devices, microcontrollers, systems-on-chip, FPGAs, network devices. These devices may communicate using a CAN-based protocol, a CAN-XL-based protocol, a CAN FD-based protocol, and other similar protocols.

Within the appended claims, unless the specific term "means for" or "step for" is used within a given claim, it is not intended that the claim be interpreted under 35 U.S.C. 136, paragraph 6.

Use of broader terms such as "comprises," "includes," and "having" should be understood to provide support for narrower terms such as "consisting of," "consisting essentially of," and "comprised substantially of" Use of the terms "optionally," "may" "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

The invention claimed is:

1. An apparatus implementing a message-based protocol interface with a communication bus, the apparatus comprising:

message handler core circuitry comprising:

a transmit message buffer,
      wherein the transmit message buffer is configured to store at least a first portion of a transmit message;
   a transmit FIFO, wherein the transmit FIFO is configured to store at least a second portion of the transmit message, and
   receive handler circuitry configured to store at least a portion of a received message;

a transmit data memory configured to store a plurality of transmit messages including at least the transmit message; and a message handler processor comprising a processor and an instruction memory including program code, the instruction memory and program code configured to, with the processor, cause the message handler processor to:

select the transmit message from the plurality of transmit messages based on a transmit message priority;

transmit at least the first portion of the transmit message from the transmit data memory to the transmit message buffer associated with the message handler core circuitry;

transmit at least the second portion of the transmit message from the transmit data memory to the transmit FIFO associated with the message handler core circuitry; and receive the received message from the receive handler circuitry into a receive data memory.

2. The apparatus of claim 1, wherein the message-based protocol is a controller area network extra-long (CAN-XL) protocol.

3. The apparatus of claim 2, wherein the apparatus further supports operation in accordance with a Classic CAN protocol and a CAN FD protocol.

4. The apparatus of claim 1, further comprising:

protocol control circuitry configured to:

generate an output sequence encoding an outgoing message based at least in part on the transmit message and in accordance with the message-based protocol, and receive an input sequence encoding the received message in accordance with the message-based protocol.

5. The apparatus of claim 4, wherein the transmit message buffer is configured to store at least a portion of the plurality of transmit messages, and a selected transmit message is selected from the plurality of transmit messages based on the portions of the plurality of transmit messages in the transmit message buffer.

6. The apparatus of claim 5, wherein the message handler core circuitry further comprises:

a priority decoder, wherein the priority decoder is configured to select the selected transmit message based at least in part on a transmit message priority indicated in the portion of the transmit message stored in the transmit message buffer.

7. The apparatus of claim 6, wherein in an instance in which the priority decoder determines a high priority message stored in the transmit message buffer has a higher transmit message priority than the transmit message priority of the selected transmit message, the portion of the selected transmit message stored in the transmit FIFO is replaced with a portion of the high priority message.

8. The apparatus of claim 1, wherein the transmit message is selected from the transmit data memory based on a transmit message priority included in the first portion of the transmit message and-wherein, in an instance in which the transmit message is selected by the message handler core circuitry to be transmitted, the second portion of the transmit message is transmitted to the transmit FIFO.

9. The apparatus of claim 1, wherein a payload size of the transmit message is bigger than a maximum capacity of the transmit FIFO, and wherein the transmit message is transmitted to the transmit FIFO in portions according to a paging scheme.

10. The apparatus of claim 1, further comprising a buffer status generator, wherein the buffer status generator is configured to generate a buffer status code indicating a status of the transmit message buffer.

11. The apparatus of claim 10, wherein the message handler processor updates the transmit FIFO based on the buffer status code after updating a software-programmable message buffer request bit.

12. The apparatus of claim 1, wherein the transmit message buffer is configured to store the portion of two transmit messages, and wherein the transmit FIFO is configured to store the second portion of one selected transmit message.

13. The apparatus of claim 1, wherein the transmit data memory is configured to store a plurality of transmit messages.

14. The apparatus of claim 1, wherein the receive data memory is configured to store a plurality of received messages.

15. A computer-implemented method for transmitting messages on a communication bus in compliance with a message-based protocol, the computer-implemented method comprising:

receiving, at a message handler processor, a plurality of transmit messages, wherein the message handler processor comprises a processor and an instruction memory including program code;

storing the plurality of transmit messages in a transmit data memory;

selecting, a transmit message from the plurality of transmit messages based on a transmit message priority associated with the transmit message;

transmitting at least a first portion of the transmit message from the transmit data memory to a transmit message buffer associated with message handler core circuitry;

receiving, from the message handler core circuitry, notification of a selected transmit message; and transmitting at least a second portion of the transmit message, comprising at least a payload, from the transmit data memory to a transmit FIFO associated with the message handler core circuitry to be transmitted on the communication bus.

16. The computer-implemented method of claim 15, wherein the message-based protocol is a controller area network extra-long (CAN-XL) protocol.

17. The computer-implemented method of claim 15, wherein the message handler processor comprises a combination of software and hardware components and the message handler core circuitry comprises hardware components.

18. The computer-implemented method of claim 17, further comprising:

receiving, from the message handler core circuitry a received message; and storing the received message in a receive data memory.

19. An apparatus implementing a message-based protocol interface with a communication bus, the apparatus comprising:

message handler core circuitry comprising:

a transmit message buffer, wherein the transmit message buffer is configured to store a first portion of a selected transmit message;

a transmit FIFO, wherein at least a second portion of the selected transmit message is transmitted by a message handler processor to the transmit FIFO, wherein a payload size of the selected transmit message is bigger than a maximum capacity of the transmit FIFO, and wherein the transmit message is transmitted to the transmit FIFO in portions according to a paging scheme;

receive handler circuitry configured to store at least a portion of a received message; and the message handler processor comprising a processor and an instruction memory including program code, the instruction memory and program code configured to, with the processor, cause the message handler processor to:

transmit the second portion of the selected transmit message to the transmit FIFO; and receive the received message from the receive handler circuitry into a receive data memory.

* * * * *